(12) United States Patent
Lee et al.

(10) Patent No.: US 11,754,850 B2
(45) Date of Patent: *Sep. 12, 2023

(54) PRISM APPARATUS, AND CAMERA APPARATUS INCLUDING THE SAME

(71) Applicant: LG ELECTRONICS INC., Seoul (KR)

(72) Inventors: Jayong Lee, Seoul (KR); Hyungjoo Kang, Seoul (KR); Kwanhyung Kim, Seoul (KR); Dongryeol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

This patent is subject to a terminal disclaimer.

(21) Appl. No.: 16/772,133

(22) PCT Filed: Dec. 13, 2018

(86) PCT No.: PCT/KR2018/015875
§ 371 (c)(1),
(2) Date: Jun. 11, 2020

(87) PCT Pub. No.: WO2019/117652
PCT Pub. Date: Jun. 20, 2019

(65) Prior Publication Data
US 2021/0080690 A1 Mar. 18, 2021

Related U.S. Application Data

(60) Provisional application No. 62/648,348, filed on Mar. 26, 2018, provisional application No. 62/598,475, filed on Dec. 14, 2017.

(30) Foreign Application Priority Data

Aug. 21, 2018 (KR) .......................... 10-2018-0097631

(51) Int. Cl.
*G02B 27/64* (2006.01)
*G02B 26/08* (2006.01)
(Continued)

(52) U.S. Cl.
CPC ......... *G02B 27/646* (2013.01); *G02B 7/1805* (2013.01); *G02B 13/0065* (2013.01);
(Continued)

(58) Field of Classification Search
None
See application file for complete search history.

(56) References Cited

U.S. PATENT DOCUMENTS 6,130,993 A * 10/2000 Hayakawa ......... H04N 5/23287
396/89
6,243,132 B1 6/2001 Lee et al.
(Continued)

FOREIGN PATENT DOCUMENTS

CN 1181676 5/1998
CN 107277313 10/2017
(Continued)

OTHER PUBLICATIONS

PCT International Application No. PCT/KR2018/015875, International Search Report dated Apr. 4, 2019, 3 pages.
(Continued)

*Primary Examiner* — Derek S. Chapel
(74) *Attorney, Agent, or Firm* — LEE, HONG, DEGERMAN, KANG & WAIMEY PC

(57) ABSTRACT

A prism apparatus, and a camera and an image display apparatus including the same are disclosed. The prism apparatus includes: a first prism configured to reflect input light toward a first reflected direction, a first actuator configured to change an angle of the first prism about a first rotation axis to change the first reflected direction based on
(Continued)

a first control signal, a second prism configured to reflect the light reflected from the first prism toward a second reflected direction, and a second actuator configured to change an angle of the second prism about a second rotation axis to change the second reflected direction based on a second control signal.

19 Claims, 22 Drawing Sheets

(51) Int. Cl.
| | |
|---|---|
| *G03B 5/00* | (2021.01) |
| *G02B 7/18* | (2021.01) |
| *G02B 13/00* | (2006.01) |
| *G03B 17/17* | (2021.01) |
| *H04N 23/68* | (2023.01) |
| *H02K 11/215* | (2016.01) |
| *G03B 3/10* | (2021.01) |
| *H02K 41/035* | (2006.01) |

(52) U.S. Cl.
CPC ........... *G02B 26/0883* (2013.01); *G03B 3/10* (2013.01); *G03B 5/00* (2013.01); *G03B 17/17* (2013.01); *H02K 11/215* (2016.01); *H02K 41/0356* (2013.01); *H04N 23/685* (2023.01); *H04N 23/6812* (2023.01); *G03B 2205/003* (2013.01); *G03B 2205/0023* (2013.01); *G03B 2205/0069* (2013.01)

(56) References Cited

U.S. PATENT DOCUMENTS

| | | | |
|---|---|---|---|
| 7,940,327 B2* | 5/2011 | Yamamoto | H04N 5/2251 |
| | | | 348/151 |
| 10,334,146 B2* | 6/2019 | Im | G02B 15/14 |
| 10,884,237 B2* | 1/2021 | Cho | G01D 5/145 |
| 10,884,258 B2* | 1/2021 | Lee | G03B 17/17 |
| 10,955,658 B2* | 3/2021 | Cho | G02B 27/646 |
| 2004/0141065 A1 | 7/2004 | Hara et al. | |
| 2013/0038689 A1* | 2/2013 | McDowall | H04N 5/2355 |
| | | | 348/45 |
| 2013/0278785 A1 | 10/2013 | Nomura et al. | |
| 2017/0294476 A1 | 10/2017 | Hu et al. | |
| 2021/0096322 A1* | 4/2021 | Kang | H04N 5/23258 |
| 2021/0208487 A1* | 7/2021 | Cho | G02B 26/0833 |
| 2021/0311372 A1* | 10/2021 | Jeong | H04N 5/23212 |

FOREIGN PATENT DOCUMENTS

| | | |
|---|---|---|
| JP | 2007-058156 | 3/2007 |
| KR | 10-1998-0022865 | 7/1998 |
| KR | 10-0864691 | 10/2008 |
| KR | 10-2015-0000180 | 1/2015 |
| KR | 10-1622698 | 5/2016 |
| KR | 10-2017-0105236 | 9/2017 |
| WO | 2016-166730 | 10/2016 |

OTHER PUBLICATIONS

European Patent Office Application Serial No. 18212207.7, Search Report dated Apr. 26, 2019, 6 pages.
The State Intellectual Property Office of the People's Republic of China Application Serial No. 201811531640.X, Office Action dated May 25, 2020, 9 pages.
United States Patent and Trademark Office U.S. Appl. No. 16/220,687, Office Action dated Feb. 19, 2020, 18 pages.

* cited by examiner

PRISM APPARATUS, AND CAMERA APPARATUS INCLUDING THE SAME

CROSS-REFERENCE TO RELATED APPLICATIONS

This application is the National Stage filing under 35 U.S.C. 371 of International Application No. PCT/KR2018/015875, filed on Dec. 13, 2018, which claims the benefit of U.S. Provisional Application No. 62/598,475, filed on Dec. 14, 2017, and 62/648,348, filed on Mar. 26, 2018, and also claims the benefit of earlier filing date and right of priority to Korean Application No. 10-2018-0097631, filed on Aug. 21, 2018, the contents of which are all hereby incorporated by reference herein in their entirety.

TECHNICAL FIELD

The present invention relates to a prism apparatus, and a camera apparatus including the same, and more particularly, to a prism apparatus capable of performing optical image stabilization (OIS) for compensating movement of dual prism caused by camera shake, for example due to trembling hands, and a camera and an image display apparatus including the prism apparatus.

BACKGROUND ART

A camera is an apparatus for photographing an image. Recently, as a camera is employed in a mobile terminal, the research on the downsizing of a camera has been progressed.

Meanwhile, in addition to the downsizing trend of the camera, an auto focus function and an optical image stabilization (OIS) function are adopted.

Particularly, for performing optical image stabilization (OIS) function, it is important to accurately detect and compensate movement of dual prism caused by camera shake.

DISCLOSURE

Technical Problem

The present invention has been made in view of the above problems, and provides a prism apparatus capable of performing optical image stabilization (OIS) for compensating movement of dual prism caused by camera shake, for example due to trembling hand(s), and a camera and an image display apparatus including the prism apparatus.

The present invention further provides a prism apparatus capable of performing optical image stabilization (OIS) by independently rotating a dual prism, and a camera and an image display apparatus including the prism apparatus.

The present invention further provides a slim camera and an image display apparatus including a prism apparatus.

Technical Solution

In accordance with an aspect of the present invention, a prism apparatus includes: a first prism configured to reflect input light toward a first reflected direction, a first actuator configured to change an angle of the first prism about a first rotation axis to change the first reflected direction based on a first control signal, a second prism configured to reflect the light reflected from the first prism toward a second reflected direction, and a second actuator configured to change an angle of the second prism about a second rotation axis to change the second reflected direction based on a second control signal.

The first prism includes an internal first reflective surface and the second prism includes an internal second reflective surface configured to reflect the light.

The first prism is configured to receive the input light through a first entry prism surface and output the input light reflected from the internal first reflective surface through a first exit prism surface, and the second prism is configured to receive the reflected light through a second entry prism surface and output the reflected light reflected from the internal second reflective surface through a second exit prism surface.

The first prism and second prism are configured such that the first exit prism surface faces the second entry prism surface.

The first rotation axis of the first prism is perpendicular to the second rotation axis of the second prism.

In response to a movement causing rotation of the first prism about the first rotation axis by a first angle and rotation of the second prism about the second rotation axis by a second angle, the first actuator is configured to rotate the first prism in a third direction opposite the first direction by a third angle in response to the first control signal, the second actuator is configured to rotate the second prism in a fourth direction opposite the second direction by a fourth angle in response to the second control signal, wherein the third angle is half of the first angle, and wherein the fourth angle is half of the second angle.

The prism apparatus further includes: a first hall sensor configured to sense an angle change of the first prism based on a first magnetic field, and a second hall sensor configured to sense an angle change of the second prism based on a second magnetic field.

The first actuator includes a first drive magnet and a first drive coil.

The prism apparatus further includes: a first prism holder configured to secure the first prism, a first yoke coupled to a rear of the first prism holder, the first drive magnet coupled to a rear of the first yoke, a first coil holder including a plurality of protrusions protruding toward the first prism holder, wherein each of the plurality of protrusions includes an opening, and wherein the openings define the first rotation axis, wherein the first drive coil is disposed between the first coil holder and the first yoke, wherein the first prism holder includes a plurality of bosses configured to engage with the openings of the plurality of protrusions to allow rotation of the first prism about the first prism axis.

The second actuator includes a second drive magnet and a second drive coil.

The prism apparatus further includes: a second prism holder configured to secure the second prism, a second yoke coupled to a rear of the second prism holder, the second drive magnet coupled to a rear of the second yoke, a second coil holder including a plurality of protrusions protruding toward the second prism holder, wherein each of the plurality of protrusions includes an opening, and wherein the openings define the second rotation axis, wherein the second drive coil is disposed between the second coil holder and the second yoke, wherein the second prism holder includes a plurality of bosses configured to engage with the openings of the plurality of protrusions to allow rotation of the second prism about the second prism axis.

The refractive indices of the first prism and the second prism are 1.7 or greater.

The refractive indices of the first prism and the second prism are less than 1.7, and wherein a reflective coating is formed on reflective surfaces of the first prism and the second prism.

In accordance with an aspect of the present invention, a camera apparatus includes: a gyro sensor configured to sense a movement of the camera apparatus, a dual prism apparatus configured to direct input light, a lens apparatus comprising a plurality of lenses configured to be adjusted to achieve variable focus, and an image sensor configured to generate an image signal based on the input light, wherein the dual prism apparatus includes: a first prism configured to reflect input light toward a first reflected direction, a first actuator configured to change an angle of the first prism about a first rotation axis to change the first reflected direction based on a first control signal, a second prism configured to reflect the light reflected from the first prism toward a second reflected direction, and a second actuator configured to change an angle of the second prism about a second rotation axis to change the second reflected direction based on a second control signal for outputting the reflected light toward the lens apparatus and the image sensor.

The camera apparatus further includes: a first hall sensor configured to sense an angle change of the first prism caused by the movement based on a first magnetic field, and a second hall sensor configured to sense an angle change of the second prism caused by the movement based on a second magnetic field.

The camera apparatus further includes a drive controller configured to generate the first control signal and the second control signal for stabilizing an image being captured by the image sensor, wherein the first control signal is based on the angle change of the first prism caused by the movement and the second control signal is based on the angle change of the second prism caused by the movement.

The first prism includes an internal first reflective surface and the second prism includes an internal second reflective surface configured to reflect the light.

The first prism is configured to receive the input light through a first entry prism surface and output the input light reflected from the internal first reflective surface through a first exit prism surface, and the second prism is configured to receive the reflected light through a second entry prism surface and output the reflected light reflected from the internal second reflective surface through a second exit prism surface.

The first prism and second prism are configured such that the first exit prism surface faces the second entry prism surface.

A direction of the input light into the first entry prism surface is parallel to the image sensor.

The image sensor receives light corresponding to an object being photographed from the dual prism apparatus while the image sensor is positioned perpendicularly to the object being photographed.

One or more of the plurality of lenses are moved along an axis for achieving variable focus, and the axis is perpendicular to the direction of the input light into the first entry prism surface and the light output from the first prism through the first exit prism surface.

The first rotation axis of the first prism is perpendicular to the second rotation axis of the second prism.

The camera apparatus further includes a drive controller, wherein: in response to the movement causing rotation of the first prism about the first rotation axis by a first angle and rotation of the second prism about the second rotation axis by a second angle, the drive controller is configured to: generate the first control signal to cause the first actuator to rotate the first prism in a third direction opposite the first direction by a third angle, and generate the second control signal to cause the second actuator to rotate the second prism in a fourth direction opposite the second direction by a fourth angle, wherein the third angle is half of the first angle, and wherein the fourth angle is half of the second angle.

The camera apparatus further includes: a first prism holder configured to secure the first prism, a first yoke coupled to a rear of the first prism holder, a first drive magnet of the first actuator coupled to a rear of the first yoke, a first coil holder including a plurality of protrusions protruding toward the first prism holder, wherein each of the plurality of protrusions includes an opening, and wherein the openings define the first rotation axis, wherein a first drive coil of the first actuator is disposed between the first coil holder and the first yoke, wherein the first prism holder includes a plurality of bosses configured to engage with the openings of the plurality of protrusions to allow rotation of the first prism about the first prism axis.

The camera apparatus further includes: a second prism holder configured to secure the second prism, a second yoke coupled to a rear of the second prism holder, a second drive magnet of the second actuator coupled to a rear of the second yoke, a second coil holder including a plurality of protrusions protruding toward the second prism holder, wherein each of the plurality of protrusions includes an opening, and wherein the openings define the second rotation axis, wherein a second drive coil of the second actuator is disposed between the second coil holder and the second yoke, wherein the second prism holder includes a plurality of bosses configured to engage with the openings of the plurality of protrusions to allow rotation of the second prism about the second prism axis.

The prism apparatus according to an embodiment of the present invention includes: a first prism to reflect input light; a first actuator to change an angle of the first prism with reference to a first rotation axis, based on a first control signal; a second prism to reflect the light from the first prism; and a second actuator to change an angle of the second prism with reference to a second rotation axis, based on a second control signal. Accordingly, it is possible to implement the optical image stabilization (OIS) for a dual prism. In particular, the optical image stabilization (OIS) can be implemented based on a plurality of rotation axes by independently rotating the dual prism.

Meanwhile, the first prism and the second prism are disposed to intersect with each other. Accordingly, since the optical paths of the first prism and the second prism are different from each other, it is possible to implement an L-type camera, and thus a slim camera having a reduced thickness can be implemented.

Meanwhile, the prism apparatus further includes: a first hall sensor to sense a magnetic field or change of the magnetic field according to the angle change of the first prism; and a second hall sensor to sense a magnetic field or change of the magnetic field according to the angle change of the second prism. Accordingly, it is possible to implement the optical image stabilization (OIS) for the dual prism.

Meanwhile, the first actuator includes a first drive magnet and a first drive coil. Accordingly, it is possible to implement the optical image stabilization (OIS) for the first prism.

Meanwhile, the first drive magnet is attached to a second surface, which is a rear surface of the first surface of the first yoke, the first drive coil is disposed between the first coil holder and the first yoke, and a boss in both ends of the first prism holder is coupled with the opening formed in the protrusion of the first coil holder. Accordingly, the first drive magnet, the first prism holder, and the first prism can be rotated based on the first rotation axis.

Meanwhile, the second actuator includes a second drive magnet and a second drive coil. Accordingly, it is possible to implement the optical image stabilization (OIS) for the second prism.

Meanwhile, the second drive magnet is attached to a second surface, which is a rear surface of the first surface of the second yoke, the second drive coil is disposed between the second coil holder and the second yoke, and a boss in both ends of the second prism holder is coupled with the opening formed in the protrusion of the second coil holder. Accordingly, the second drive magnet, the second prism holder, and the second prism can be rotated based on the second rotation axis.

Meanwhile, when the first prism moves at a first angle of a first direction of the first rotation axis, the first actuator changes the first prism into a second angle which is half of the first angle, in a second direction opposite to the first direction of the first rotation axis. Accordingly, the compensation angle in the optical image stabilization (OIS) becomes small, so that the accuracy of the optical image stabilization (OIS) can be improved.

Meanwhile, when the second prism moves at a third angle of a third direction of the second rotation axis, the second actuator changes the second prism into a fourth angle which is half of the third angle, in a fourth direction opposite the third direction of the second rotation axis. Accordingly, the compensation angle in the optical image stabilization (OIS) becomes small, so that the accuracy of the optical image stabilization (OIS) can be improved.

Meanwhile, refractive indices of the first prism and the second prism are 1.7 or more. Accordingly, the total reflection can be performed in the first prism and the second prism, and thus, light can be transmitted in the direction of the image sensor.

Meanwhile, refractive indices of the first prism and the second prism are less than 1.7, and a reflective coating is formed on reflective surfaces of the first prism and the second prism respectively. Accordingly, the total reflection can be performed in the first prism and the second prism, and thus, light can be transmitted in the direction of the image sensor.

The camera according to an embodiment of the present invention includes: a gyro sensor to sense motion; a prism apparatus to change an angle of input light with reference to a first rotation axis and a second rotation axis, and to output the light, in order to compensate the motion sensed by the gyro sensor; a lens apparatus including a plurality of lenses, to move at least one lens to achieve variable focus, and to output the light from the prism apparatus by using the moved lens; and an image sensor to convert the light from the lens apparatus into an electric signal. Accordingly, it is possible to implement the optical image stabilization (OIS) for the dual prism. In particular, the optical image stabilization (OIS) can be implemented based on a plurality of rotation axes by independently rotating the dual prism.

Meanwhile, the camera further includes a drive controller to control the first actuator based on the first control signal and first magnetic field or change of the magnetic field information from the first hall sensor, and to control the second actuator based on the second control signal and second magnetic field or change of the magnetic field information from the second hall sensor. Meanwhile, accurate optical image stabilization (OIS) can be implemented by a closed loop control of the drive controller.

The image display apparatus according to an embodiment of the present invention includes: a display; a camera; a controller to control the display to display an image photographed by the camera; and a gyro sensor to sense motion, wherein the camera includes: a prism apparatus to change an angle of input light with reference to a first rotation axis and a second rotation axis, and to output the light, in order to compensate the motion sensed by the gyro sensor; a lens apparatus including a plurality of lenses, to move at least one lens to achieve variable focus, and to output the light from the prism apparatus by using the moved lens; and an image sensor to convert the light from the lens apparatus into an electric signal. Accordingly, it is possible to implement the optical image stabilization (OIS) for the dual prism. In particular, the optical image stabilization (OIS) can be implemented based on a plurality of rotation axes by independently rotating the dual prism.

Advantageous Effects

As is apparent from the above description, according to an embodiment of the present invention, there is provided a prism apparatus including: a first prism configured to reflect input light toward a first reflected direction, a first actuator configured to change an angle of the first prism about a first rotation axis to change the first reflected direction based on a first control signal, a second prism configured to reflect the light reflected from the first prism toward a second reflected direction, and a second actuator configured to change an angle of the second prism about a second rotation axis to change the second reflected direction based on a second control signal. Accordingly, it is possible to implement the optical image stabilization (OIS) for a dual prism. In particular, the optical image stabilization (OIS) can be implemented based on a plurality of rotation axes by independently rotating the dual prism.

The first prism comprises an internal first reflective surface and the second prism comprises an internal second reflective surface configured to reflect the light. Accordingly, light from the first prism may be stably transmitted to the second prism.

The first rotation axis of the first prism is perpendicular to the second rotation axis of the second prism. Accordingly, since the optical paths of the first prism and the second prism are different from each other, it is possible to implement an L-type camera, and thus a slim camera having a reduced thickness can be implemented.

In response to a movement causing rotation of the first prism about the first rotation axis by a first angle and rotation of the second prism about the second rotation axis by a second angle, the first actuator is configured to rotate the first prism in a third direction opposite the first direction by a third angle in response to the first control signal, the second actuator is configured to rotate the second prism in a fourth direction opposite the second direction by a fourth angle in response to the second control signal, wherein the third angle is half of the first angle, and wherein the fourth angle is half of the second angle. Accordingly, the compensation angle for the optical image stabilization (OIS) becomes small, so that the accuracy of the optical image stabilization (OIS) may be improved.

The prism apparatus further includes: a first hall sensor configured to sense an angle change of the first prism based on a first magnetic field, and a second hall sensor configured to sense an angle change of the second prism based on a second magnetic field. Accordingly, it is possible to implement the optical image stabilization (OIS) for the dual prism.

The prism apparatus further includes: a first prism holder configured to secure the first prism, a first yoke coupled to a rear of the first prism holder, the first drive magnet coupled to a rear of the first yoke, a first coil holder including a plurality of protrusions protruding toward the first prism holder, wherein each of the plurality of protrusions comprises an opening, and wherein the openings define the first rotation axis, wherein the first drive coil is disposed between the first coil holder and the first yoke, wherein the first prism holder includes a plurality of bosses configured to engage with the openings of the plurality of protrusions to allow rotation of the first prism about the first prism axis. Accordingly, the first drive magnet, the first prism holder, and the first prism can be rotated based on the first rotation axis.

The prism apparatus further includes: a second prism holder configured to secure the second prism, a second yoke coupled to a rear of the second prism holder, the second drive magnet coupled to a rear of the second yoke, a second coil holder including a plurality of protrusions protruding toward the second prism holder, wherein each of the plurality of protrusions comprises an opening, and wherein the openings define the second rotation axis, wherein the second drive coil is disposed between the second coil holder and the second yoke, wherein the second prism holder comprises a plurality of bosses configured to engage with the openings of the plurality of protrusions to allow rotation of the second prism about the second prism axis. Accordingly, the second drive magnet, the second prism holder, and the second prism can be rotated based on the second rotation axis.

The refractive indices of the first prism and the second prism are 1.7 or greater. Accordingly, the total reflection can be performed in the first prism and the second prism, and thus, light can be transmitted in the direction of the image sensor.

The refractive indices of the first prism and the second prism are less than 1.7, and wherein a reflective coating is formed on reflective surfaces of the first prism and the second prism. Accordingly, the total reflection can be performed in the first prism and the second prism, and thus, light can be transmitted in the direction of the image sensor.

According to an embodiment of the present invention, there is provided a camera apparatus including: a gyro sensor configured to sense a movement of the camera apparatus, a dual prism apparatus configured to direct input light, a lens apparatus comprising a plurality of lenses configured to be adjusted to achieve variable focus, and an image sensor configured to generate an image signal based on the input light, wherein the dual prism apparatus comprises: a first prism configured to reflect input light toward a first reflected direction, a first actuator configured to change an angle of the first prism about a first rotation axis to change the first reflected direction based on a first control signal, a second prism configured to reflect the light reflected from the first prism toward a second reflected direction, and a second actuator configured to change an angle of the second prism about a second rotation axis to change the second reflected direction based on a second control signal for outputting the reflected light toward the lens apparatus and the image sensor. Accordingly, it is possible to implement the optical image stabilization (OIS) for a dual prism. In particular, the optical image stabilization (OIS) can be implemented based on a plurality of rotation axes by independently rotating the dual prism.

The camera apparatus further includes: a first hall sensor configured to sense an angle change of the first prism caused by the movement based on a first magnetic field, and a second hall sensor configured to sense an angle change of the second prism caused by the movement based on a second magnetic field. Accordingly, it is possible to implement the optical image stabilization (OIS) for the dual prism.

The camera apparatus further includes a drive controller configured to generate the first control signal and the second control signal for stabilizing an image being captured by the image sensor, wherein the first control signal is based on the angle change of the first prism caused by the movement and the second control signal is based on the angle change of the second prism caused by the movement. Accordingly, it is possible to implement the optical image stabilization (OIS) for the dual prism.

The image sensor receives light corresponding to an object being photographed from the dual prism apparatus while the image sensor is positioned perpendicularly to the object being photographed. Accordingly, it is possible to implement an L-type camera, and thus a slim camera having a reduced thickness can be implemented.

One or more of the plurality of lenses are moved along an axis for achieving variable focus, and the axis is perpendicular to the direction of the input light into the first entry prism surface and the light output from the first prism through the first exit prism surface. Accordingly, since the optical paths of the first prism and the second prism are different from each other, it is possible to implement an L-type camera, and thus a slim camera having a reduced thickness can be implemented.

The first rotation axis of the first prism is perpendicular to the second rotation axis of the second prism. Accordingly, since the optical paths of the first prism and the second prism are different from each other, it is possible to implement an L-type camera, and thus a slim camera having a reduced thickness can be implemented.

The camera apparatus further includes a drive controller, wherein: in response to the movement causing rotation of the first prism about the first rotation axis by a first angle and rotation of the second prism about the second rotation axis by a second angle, the drive controller is configured to: generate the first control signal to cause the first actuator to rotate the first prism in a third direction opposite the first direction by a third angle, and generate the second control signal to cause the second actuator to rotate the second prism in a fourth direction opposite the second direction by a fourth angle, wherein the third angle is half of the first angle, and wherein the fourth angle is half of the second angle. Accordingly, the compensation angle for the optical image stabilization (OIS) becomes small, so that the accuracy of the optical image stabilization (OIS) may be improved.

The camera apparatus further includes: a first prism holder configured to secure the first prism, a first yoke coupled to a rear of the first prism holder, a first drive magnet of the first actuator coupled to a rear of the first yoke, a first coil holder including a plurality of protrusions protruding toward the first prism holder, wherein each of the plurality of protrusions comprises an opening, and wherein the openings define the first rotation axis, wherein a first drive coil of the first actuator is disposed between the first coil holder and the first yoke, wherein the first prism holder includes a plurality of bosses configured to engage with the openings of the plurality of protrusions to allow rotation of the first prism about the first prism axis. Accordingly, the first drive magnet, the first prism holder, and the first prism can be rotated based on the first rotation axis.

The camera apparatus further includes: a second prism holder configured to secure the second prism, a second yoke coupled to a rear of the second prism holder, a second drive magnet of the second actuator coupled to a rear of the second yoke, a second coil holder including a plurality of protrusions protruding toward the second prism holder, wherein each of the plurality of protrusions includes an opening, and wherein the openings define the second rotation axis, wherein a second drive coil of the second actuator is disposed between the second coil holder and the second yoke, wherein the second prism holder includes a plurality of bosses configured to engage with the openings of the plurality of protrusions to allow rotation of the second prism about the second prism axis. Accordingly, the second drive magnet, the second prism holder, and the second prism can be rotated based on the second rotation axis.

DESCRIPTION OF DRAWINGS

The objects, features and advantages of the present invention will be more apparent from the following detailed description in conjunction with the accompanying drawings, in which.

BEST MODE

Hereinafter, the present invention will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1A:
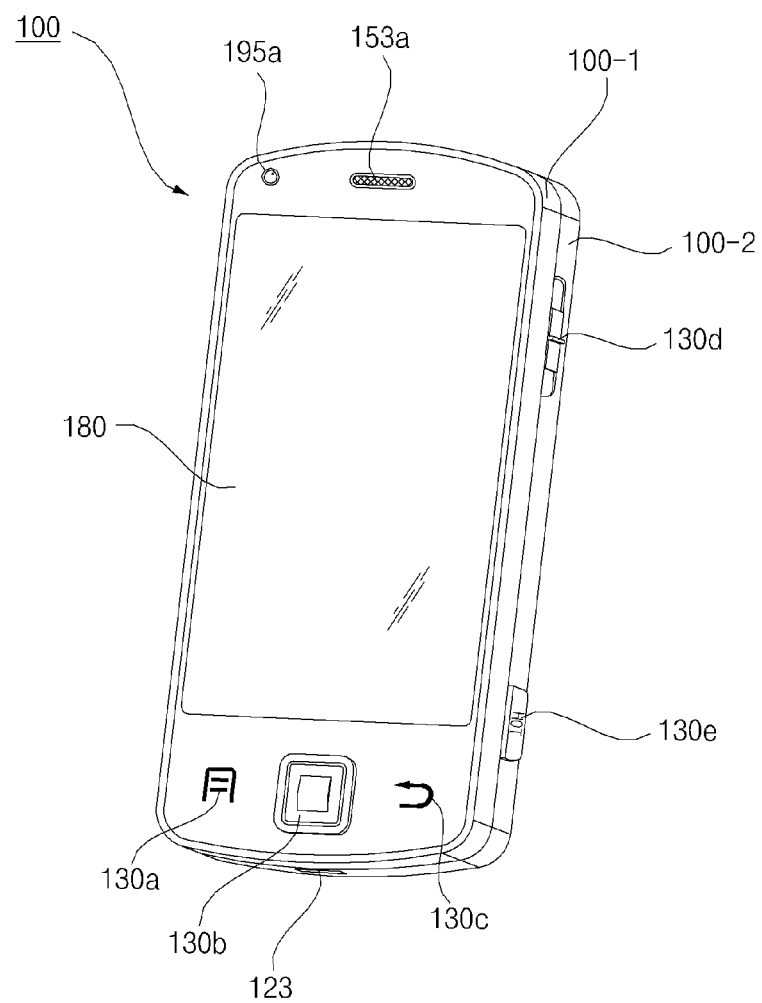
FIG. 1A is a perspective view of a mobile terminal as an example of an image display apparatus according to an embodiment of the present invention.
Figure 1B:
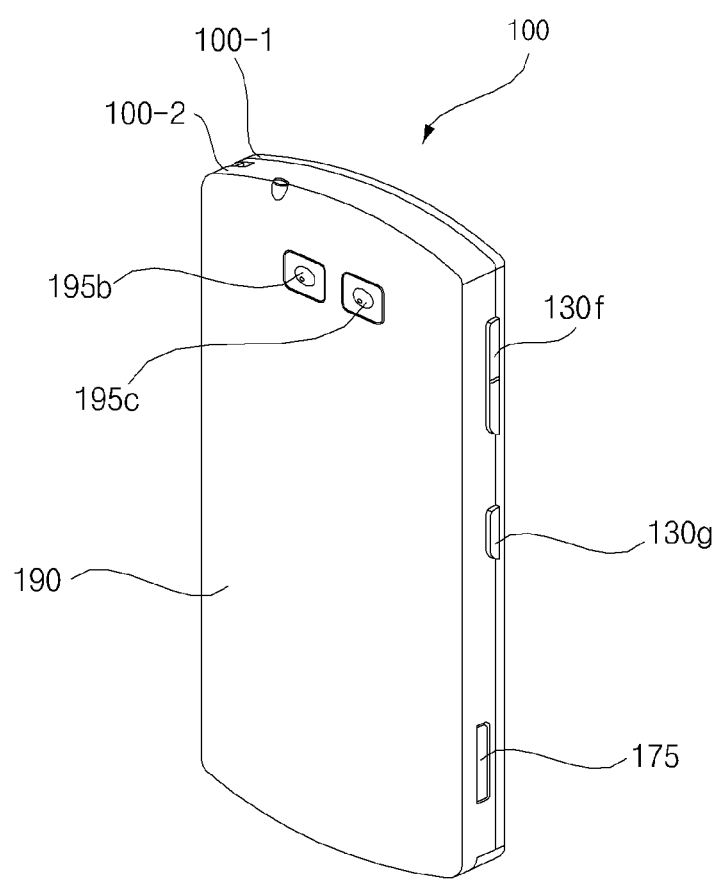
FIG. 1B is a rear perspective view of the mobile terminal shown in FIG. 1A.

FIG. 1A is a perspective view of a mobile terminal as an example of an image display apparatus according to an embodiment of the present invention, and FIG. 1B is a rear perspective view of the mobile terminal shown in FIG. 1A.

Referring to FIG. 1A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153a, a first camera 195a, and a first to third user input units 130a, 130b, and 130c may be disposed in the front case 100-1. Further, a fourth user input unit 130d, a fifth user input unit 130e, and a microphone 123 may be disposed on a lateral surface of the rear case 100-2.

In the display 180, a touchpad may be overlapped in a layer structure so that the display 180 may operate as a touch screen.

The first sound output module 153a may be implemented in the form of a receiver or a speaker. The first camera 195a may be implemented in a form suitable for photographing an image or a moving image of a user, and the like. The microphone 123 may be implemented in a form suitable for receiving a user's voice, other sounds, and the like.

The first to fifth user input units 130a, 130b, 130c, 130d and 130e and the sixth and seventh user input units 130f and 130g described below may be collectively referred to as a user input unit 130.

The microphone 123 may be disposed in the lower side of the rear case 100-2, i.e., in the lower side of the mobile terminal 100, so as to collect an audio signal. Otherwise the microphone 123 may be disposed in the upper side of the rear case 100-2, i.e., in the upper side of the mobile terminal 100, so as to collect an audio signal.

Referring to FIG. 1B, a second camera 195b, and a third camera 195c may be additionally mounted on the rear surface of the rear case 100-2, and a sixth and seventh user input units 130f and 130g, and an interface 175 may be disposed on the side surface of the rear case 100-2.

The second camera 195b has a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for shooting a three-dimensional stereoscopic image.

The second camera 195b may have a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for photographing a three-dimensional stereoscopic image.

A second sound output module (not shown) may be additionally disposed in the rear case 100-2. The second sound output module may implement a stereo function together with the first sound output module 153a, and may be used for talking in a speakerphone mode.

A power supply unit 190 for supplying power to the mobile terminal 100 may be mounted in the rear case 100-2. The power supply unit 190 may be, for example, a rechargeable battery and may be detachably coupled to the rear case 100-2 for charging or the like.

The microphone 123 may be disposed in the front surface of the rear case 100-2, i.e., in the rear surface of the mobile terminal 100 so as to collect an audio signal.

Figure 2:
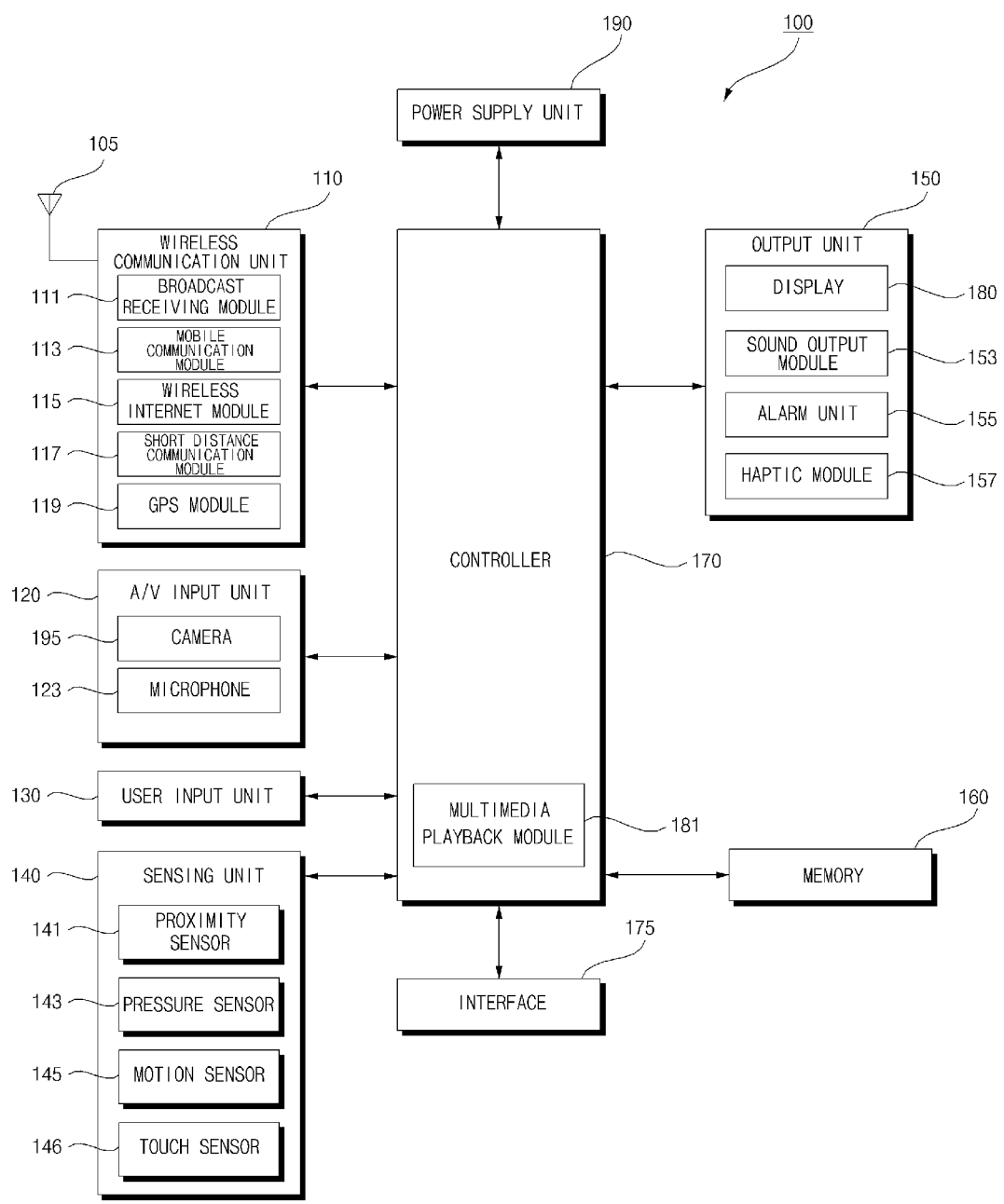
FIG. 2 is a block diagram of a mobile terminal according to an embodiment of the present invention.

FIG. 2 is a block diagram of a mobile terminal according to an embodiment of the present invention.

Referring to FIG. 2, the mobile terminal 100 may include a wireless communication unit 110, an audio/video (A/V) input unit 120, a user input unit 130, a sensing unit 140, an output unit 150, a memory 160, an interface 175, a controller 170, and a power supply unit 190. When these components are implemented in an actual application, two or more components may be combined into one component if necessary, or one component may be divided into two or more components.

The wireless communication unit 110 may include a broadcast receiving module 111, a mobile communication module 113, a wireless Internet module 115, a short distance communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short distance communication module 117 refers to a module for short distance communication. BLUETOOTH, Radio Frequency Identification (RFID), infrared Data Association (IrDA), Ultra Wideband (UWB), ZigBee, and Near Field Communication (NFC) may be used as a short distance communication technology.

The Global Position System (GPS) module 119 may receive position information from a plurality of GPS satellites.

The audio/video (A/V) input unit 120 may be used to input an audio signal or a video signal, and may include the camera 195, the microphone 123, and the like.

The camera 195 may process an image frame such as a still image or a moving image obtained by an image sensor in a video call mode or a photographing mode. Then, the processed image frame may be displayed on the display 180.

The image frame processed by the camera 195 may be stored in the memory 160 or transmitted to the outside through the wireless communication unit 110. Two or more cameras 195 may be provided according to the configuration of the terminal.

The microphone 123 may receive an external audio signal by the microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the controller 170, or the like.

The user input unit 130 may generate key input data that the user inputs for controlling the operation of the terminal. The user input unit 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing unit 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing unit 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for detecting position information and intensity information of the touch input. A sensing signal detected by the touch sensor 146 may be transmitted to the controller 180.

The output unit 150 may be used to output an audio signal, a video signal, or an alarm signal. The output unit 150 may include a display 180, a sound output module 153, an alarm unit 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless communication unit 110 or stored in the memory 160 in a call signal reception, a call mode or a recording mode, a voice recognition mode, a broadcast reception mode, and the like. The sound output module 153 may output an audio signal related to the function performed in the mobile terminal 100, e.g., a call signal reception tone, a message reception tone, and the like. The sound output module 153 may include a speaker, a buzzer, and the like.

The alarm unit 155 may output a signal for notifying the occurrence of an event of the mobile terminal 100. The alarm unit 155 may output a signal for notifying the occurrence of an event in a form other than an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized and outputted or sequentially outputted.

The memory 160 may store a program for the processing and controlling of the controller 170, and may serve to temporarily store inputted or outputted data (e.g., a phone book, a message, a still image, a moving image, or the like).

The interface 175 may serve as an interface with all external devices connected to the mobile terminal 100. The interface 175 may receive data from an external device or receive power from the external device to transmit to each component in the mobile terminal 100, and allow the data in the mobile terminal 100 to be transmitted to the external device.

The controller 170 may control, in general, the operation of each unit to control the overall operation of the mobile terminal 100. For example, the controller 170 may perform relevant control and processing for voice call, data communication, video call, and the like. In addition, the controller 170 may include a multimedia playback module 181 for playing multimedia. The multimedia playback module 181 may be configured in hardware inside the controller 170 or may be configured in software separately from the controller 170. Meanwhile, the controller 170 may include an application processor (not shown) for driving an application. Alternatively, the application processor (not shown) may be provided separately from the controller 170.

The power supply unit 190 may receive external power or internal power under the control of the controller 170 to supply power required for operation of each component.

Figure 3A:
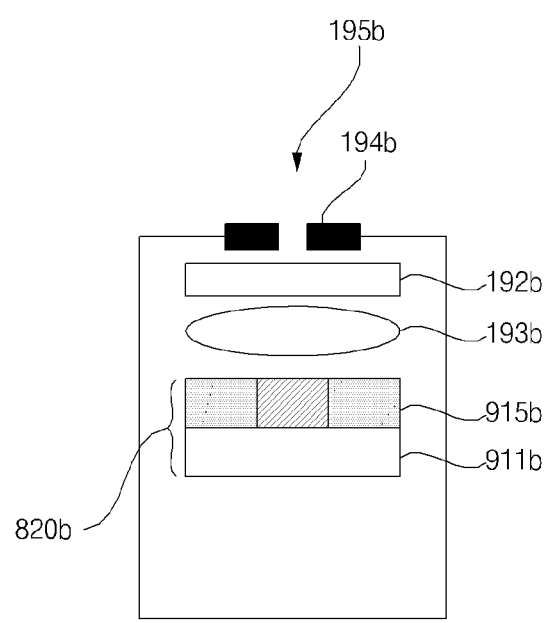
FIG. 3A is an internal cross-sectional view of a camera according to an embodiment of the present invention.

FIG. 3A is an internal cross-sectional view of a camera according to an embodiment of the present invention.

Referring to the drawing, FIG. 3A is an example of a cross-sectional view of the second camera 195b.

The second camera 195b may include an aperture 194b, a prism apparatus 192b, a lens apparatus 193b, and an image sensor 820b.

The aperture 194b may open and close the light incident on the lens apparatus 193b.

The image sensor 820b may include an RGB filter 915b, and a sensor array 911b for converting an optical signal into an electric signal, in order to sense RGB colors.

Accordingly, the image sensor 820b may sense and output RGB images, respectively.

Figure 3B:
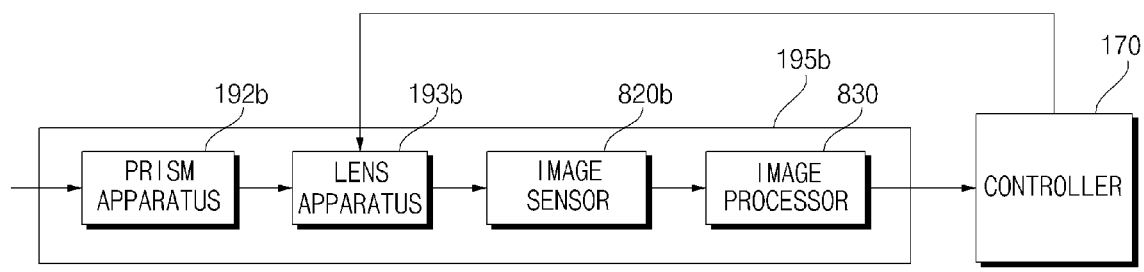
FIG. 3B is an internal block diagram of a camera according to an embodiment of the present invention.

FIG. 3B is an internal block diagram of a camera according to an embodiment of the present invention.

Referring to the drawing, FIG. 3B is an example of a block diagram for the second camera 195b.

The second camera 195b may include the prism apparatus 192b, the lens apparatus 193b, the image sensor 820b, and an image processor 830.

The image processor 830 may generate an RGB image based on an electrical signal from the image sensor 820b.

Meanwhile, the image sensor 820b may adjust an exposure time based on the electric signal.

Meanwhile, the RGB image from the image processor 830 may be transmitted to the controller 170 of the mobile terminal 100.

Meanwhile, the controller 170 of the mobile terminal 100 may output a control signal to the lens apparatus 193b for motion of a lens in the lens apparatus 193b. For example, a control signal for autofocusing may be output to the lens apparatus 193b.

Meanwhile, the controller 170 of the mobile terminal 100 may output a control signal for the optical image stabilization (OIS) function in the prism apparatus 192b to the prism apparatus 192b.

Figure 3C:
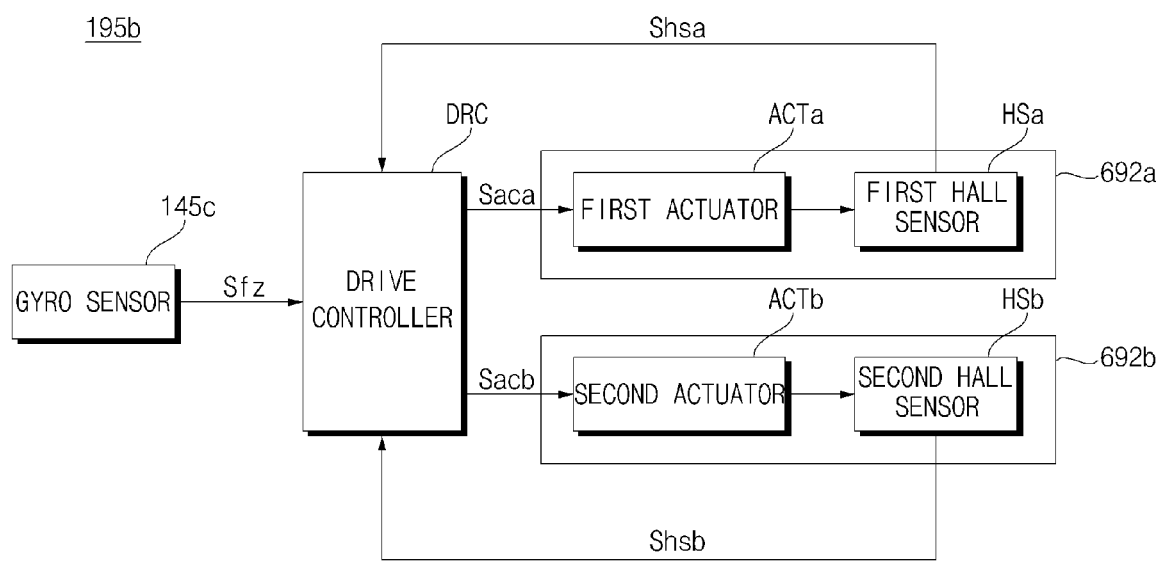
FIG. 3C and FIG. 3D are internal block diagrams of exemplary cameras according to embodiments of the present invention.
Figure 3D:
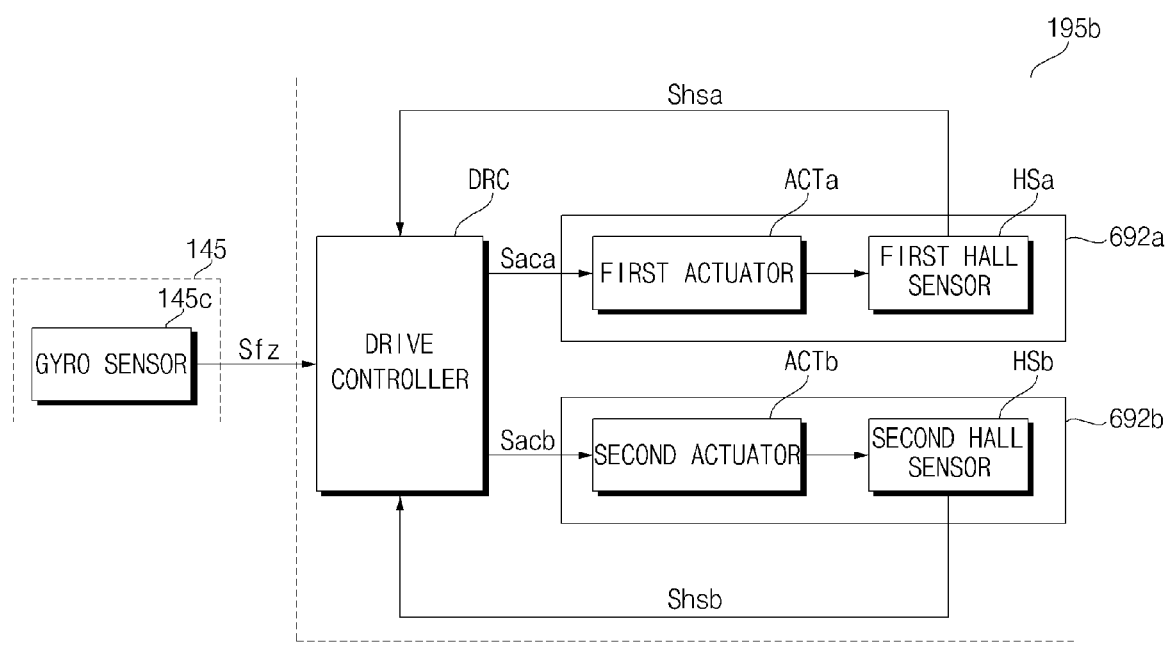

FIG. 3C and FIG. 3D are internal block diagrams of a camera according to embodiments of the present invention.

Firstly, FIG. 3C illustrates that a gyro sensor 145c, a drive controller DRC, a first prism module 692a, and a second prism module 692b are provided inside the camera 195b.

The gyro sensor 145c may detect a first direction motion and a second direction motion. The gyro sensor 145c may output motion information Sfz including the first direction motion and the second direction motion.

The drive controller DRC may output control signals Saca and Sacb for the motion compensation to a first prism module 692a and a second prism module 692b respectively, based on motion information Sfz including a first direction motion and a second direction motion from the gyro sensor 145c.

In particular, the drive controller DRC may output the control signal to a first actuator ACTa in the first prism module 692a and a second actuator ACTb in the second prism module 692b.

A first control signal Saca may be a control signal for the compensation of the first direction motion sensed by the gyro sensor 145c, and a second control signal Sacb may be a control signal for the compensation of the second direction motion sensed by the gyro sensor 145c.

The first actuator ACTa may change the angle of a first prism PSMa based on a first rotation axis, based on the first control signal Saca. See FIG. 5A.

The second actuator ACTb may change the angle of a second prism PSMb based on a second rotation axis, based on the second control signal Sacb. See FIG. 5A.

Meanwhile, a first hall sensor HSa in the first prism module 692a and a second hall sensor Hsb in the second prism module 692b may sense the change of the magnetic field so as to check movement information due to the movement of the first prism PSMa and the second prism PSMb.

Meanwhile, a first hall sensor HSa may sense an angle change of the first prism PSMa caused by the movement based on a first magnetic field, and a second hall sensor HSb may sense an angle change of the second prism PSMb caused by the movement based on a second magnetic field.

The motion information detected by the first hall sensor HSa and the second hall sensor HSb, particularly, first and second magnetic field or change of the magnetic field information Shsa and Shsb, may be input to the DRC.

The drive controller DRC may perform a PI control or the like, based on the control signals Saca and Sacb for the motion compensation and the motion information, particularly, the first and second magnetic field or change of the magnetic field information Shsa and Shsb, thereby accurately controlling the motion of the first prism PSMa and the second prism PSMb.

That is, the drive controller DRC may perform a closed loop by receiving the information Shsa and Shsb detected by the first hall sensor HSa and the second hall sensor HSb, and can accurately control the motion of the first prism PSMa and the second prism PSMb.

Next, although FIG. 3D is similar to FIG. 3C, there exists a difference in that the gyro sensor 145c is provided not in the camera 195b, but in the motion sensor 145 of a separate sensing unit 140 inside the mobile terminal 100.

Accordingly, although not shown in FIG. 3D, the camera 195b in FIG. 3D may further include an interface (not shown) for receiving a signal from an external gyro sensor 145c.

Figure 4A:
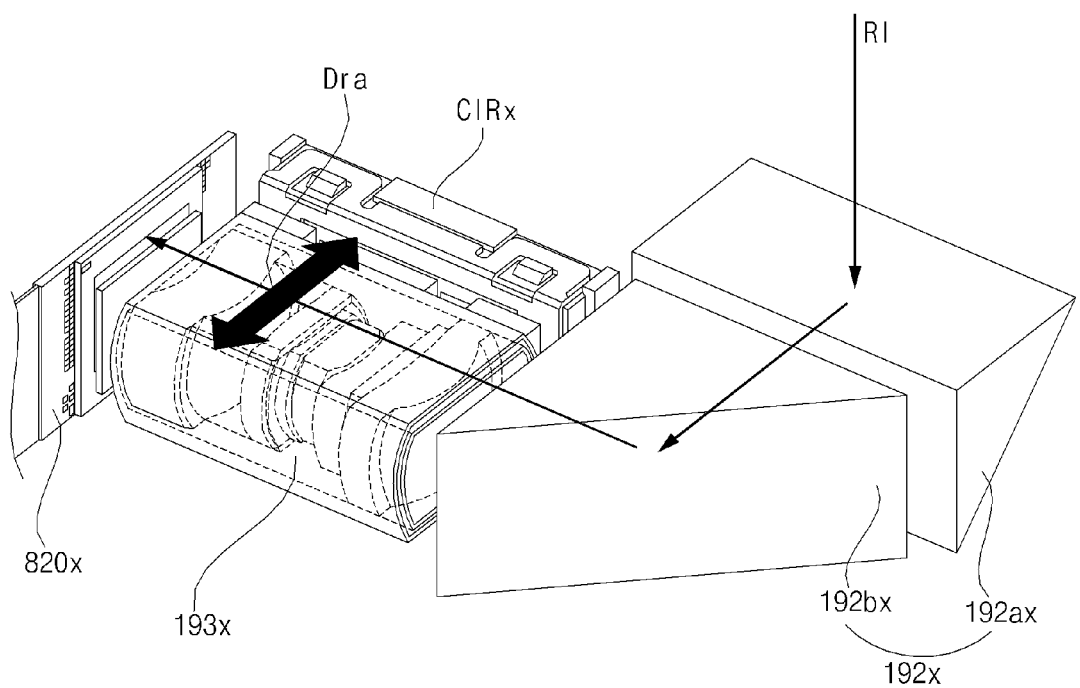
FIG. 4A is a diagram illustrating a camera having a dual prism apparatus according to an embodiment of the present invention.

Meanwhile, the motion information Sfz including the first directional motion and the second direction motion received from the gyro sensor 145c may be input to the drive controller DRC. The operation of the drive controller may be the same as that of FIG. 3C. FIG. 4A is a diagram illustrating a camera having a dual prism apparatus according to an embodiment of the present invention.

Referring to the drawing, a camera 195x of FIG. 4A may include an image sensor 820x, a lens apparatus 193x for transmitting light to the image sensor, a lens driving unit (CIRx) for moving a lens inside the lens apparatus 193x, and a dual prism apparatus 192x having a first prism 192ax and a second prism 192bx for refracting input light RI.

The camera 195x of FIG. 4A may perform the movement of the lens apparatus 193x in order to perform optical image stabilization (OIS). In the drawing, it is illustrated that the compensation is performed in the Dra direction.

This method has a disadvantage that, when the optical zoom of the lens apparatus 193x is high, the optical image stabilization (OIS) should be performed more. Therefore, the accuracy of the optical image stabilization (OIS) may be reduced.

In addition, in this case, the lens movement direction should intersect with the Dra direction, so that it is difficult to simultaneously achieve the lens movement and the movement for performing optical image stabilization (OIS).

In the present invention, in order to compensate for this, it is assumed that the optical image stabilization (OIS) is implemented inside the prism module, and the angle compensation is performed, in particular, by using a rotary actuator. According to this, by performing the angle compensation, there is an advantage that it is enough to compensate only an angle within a given range, regardless of whether the optical zoom of the lens apparatus 193x is low or high. For example, a plurality of prism modules may be used to compensate a first angle in first and second rotational axis directions, respectively. Accordingly, regardless of the optical zoom, since the angle compensation within a given range becomes possible, the accuracy of optical image stabilization (OIS) can be improved. This will be described with reference to FIG. 5A.

Figure 4B:
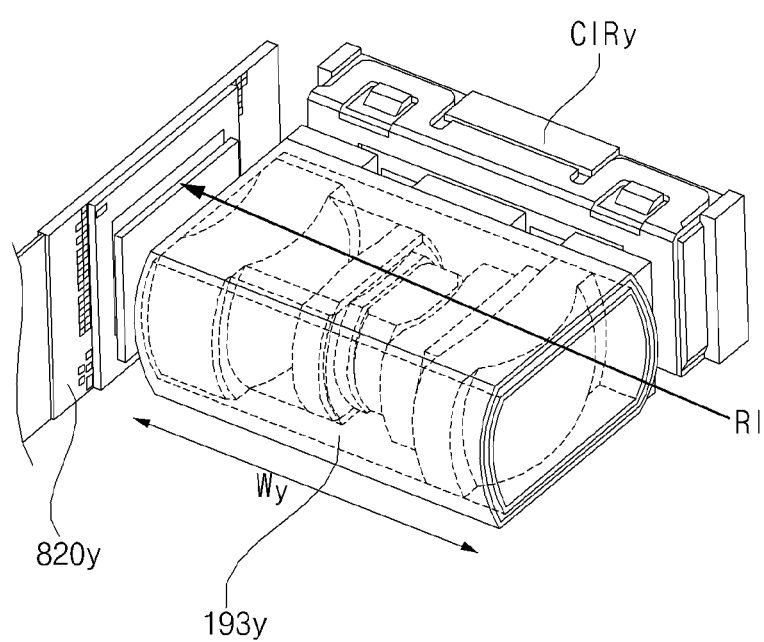
FIG. 4B and FIG. 4C are diagrams illustrating a camera in which a dual prism apparatus is omitted.
Figure 4C:
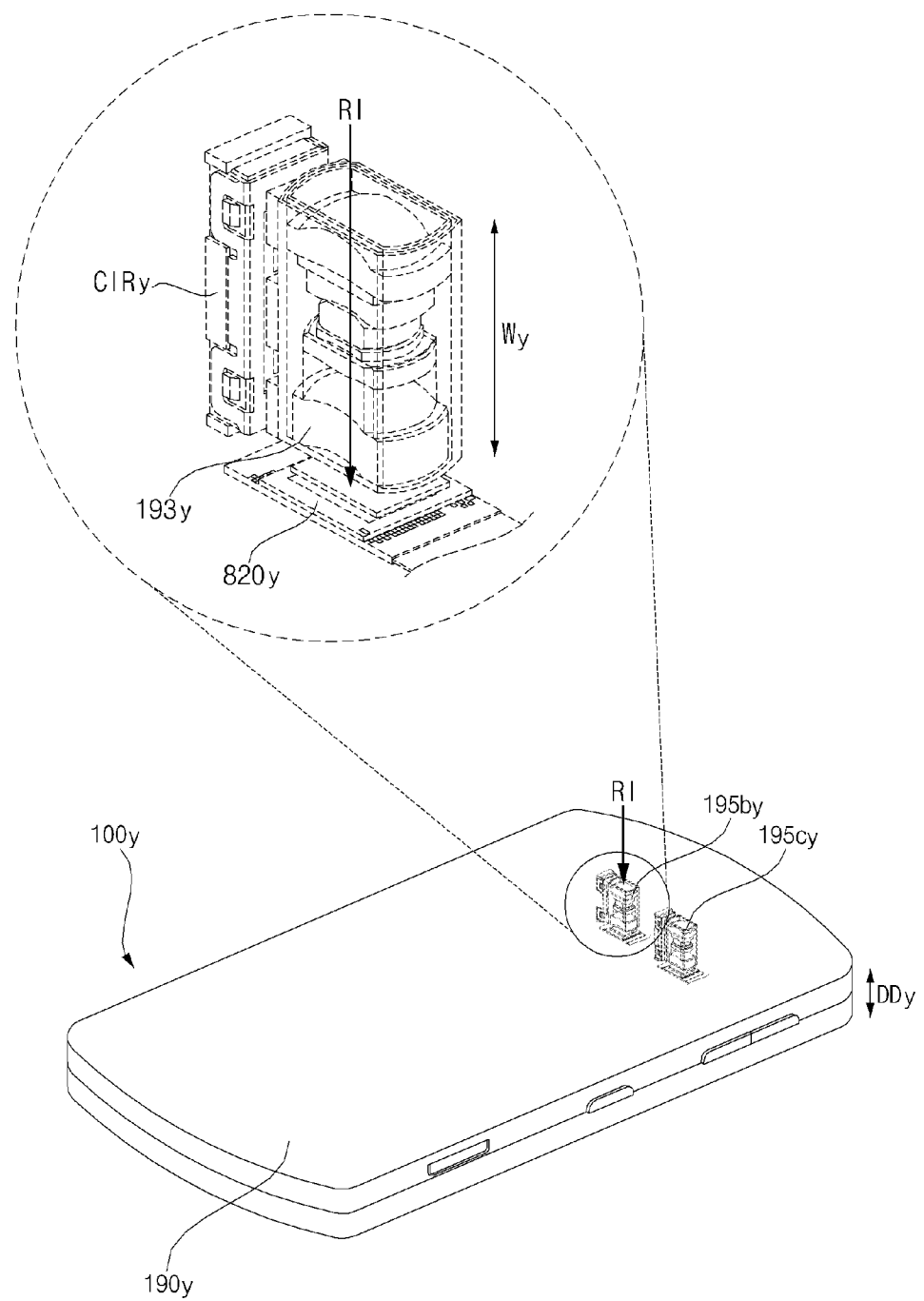

FIG. 4B and FIG. 4C are diagrams illustrating a camera in which a dual prism apparatus is omitted.

Referring to the drawing, a camera 195y of FIG. 4B may include an image sensor 820y, a lens apparatus 193y for transmitting light to the image sensor, and a lens driving unit (CIRy) for moving a lens inside the lens apparatus 193y.

Meanwhile, since the camera 195y of FIG. 4B does not have a plurality of prism apparatuses, input light RI may be directly input through the lens apparatus 193y, so that the lens apparatus 193y and the image sensor 820y should be disposed perpendicular to the input light RI.

That is, in a mobile terminal 100y of FIG. 4C, input light RI may be transmitted to the image sensor 820y via the lens apparatus 193y.

Recently, the length Wy of the lens apparatus 193y increases according to the trend of high image quality and high performance. With this structure, there is a disadvantage that, as the length Wy of the lens apparatus 193y increases, the thickness DDy of the mobile terminal 100y becomes larger.

Accordingly, in order to solve this problem, in the present invention, a dual prism may be employed, and the first prism and the second prism may be disposed to intersect with each other such that the light (RI) path of the first prism and the light path of the second prism are different. According to this structure, it is possible to implement an L-type camera, and thus a slim camera having a reduced thickness can be implemented. This will be described with reference to FIG. 5A.

Figure 5A:
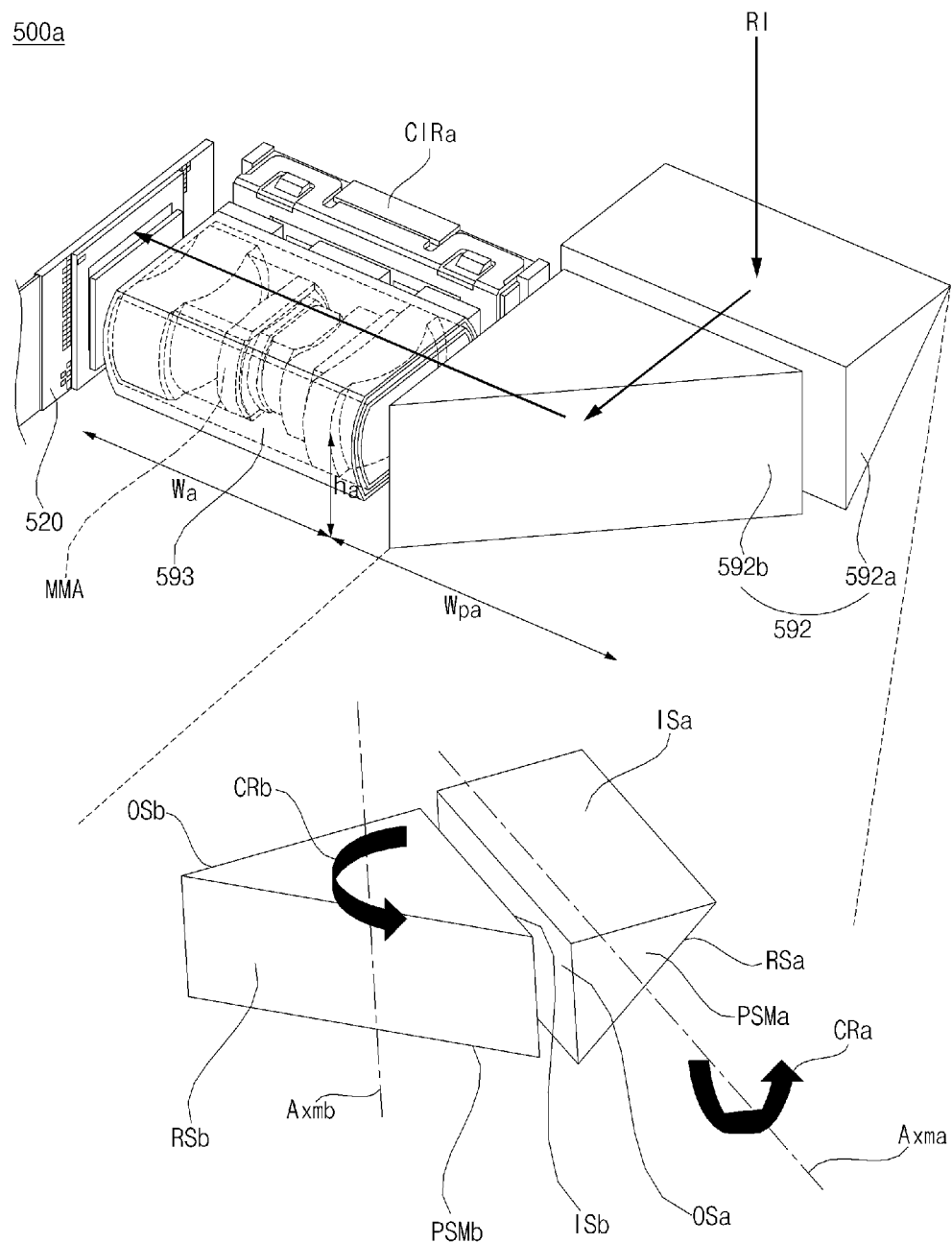
FIG. 5A is a diagram illustrating an example of a camera having a rotatable dual prism module according to an embodiment of the present invention.
Figure 5B:
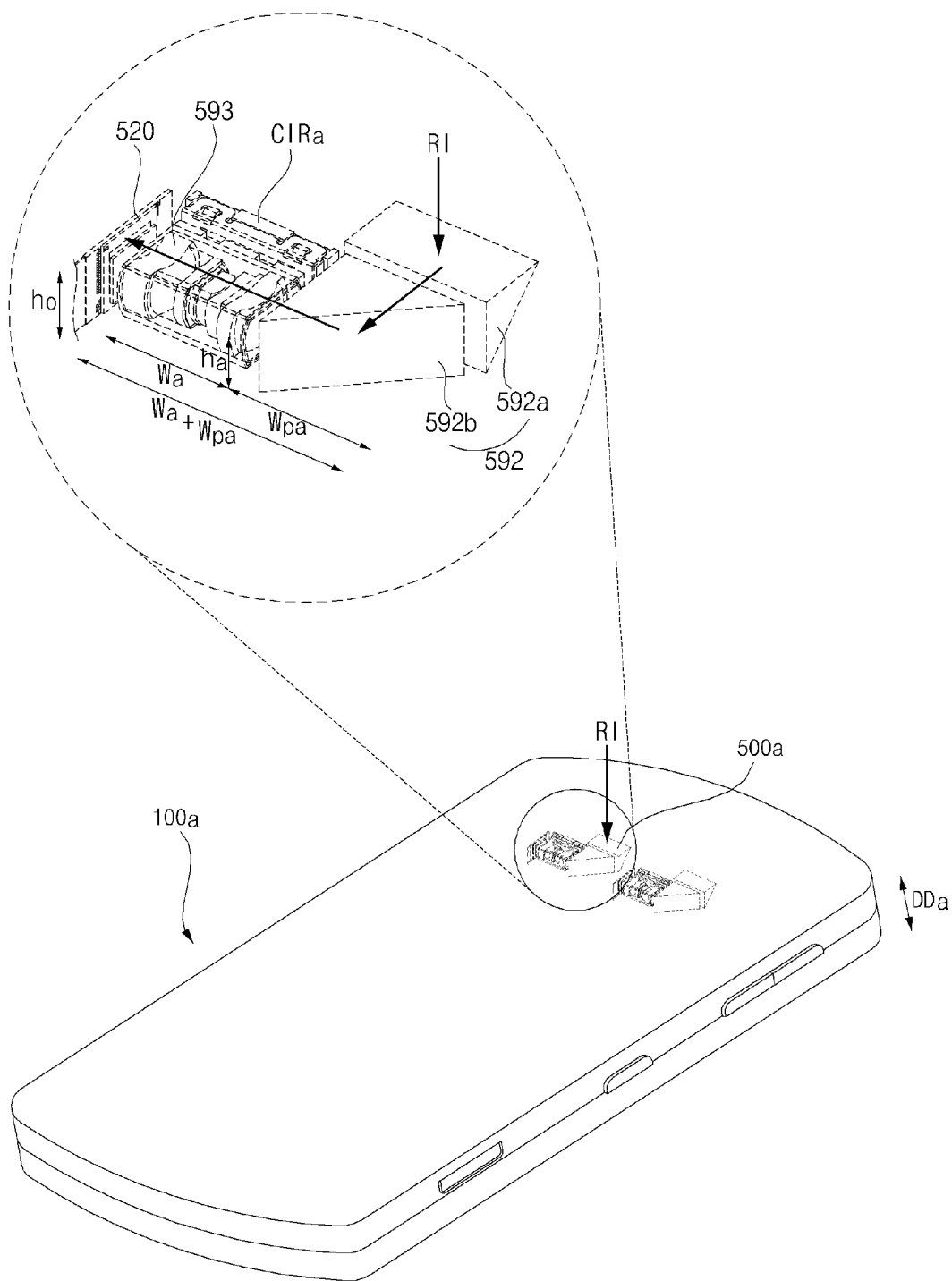
FIG. 5B is a diagram illustrating a mobile terminal having the camera of FIG. 5A.

FIG. 5A is a diagram illustrating an example of a camera having a rotatable dual prism module according to an embodiment of the present invention, and FIG. 5B is a diagram illustrating a mobile terminal having the camera of FIG. 5A.

Referring to the drawing, a camera 500a of FIG. 5A may include an image sensor 520, a lens apparatus 593 for transmitting light to the image sensor 520, a lens driving unit (CIRa) for moving a lens inside the lens apparatus 593, and a dual prism apparatus 592 having a first prism module 592a and a second prism module 592b.

The dual prism apparatus 592 may differ from FIG. 4A in that it is rotated to achieve optical image stabilization (OIS) function.

Meanwhile, unlike FIG. 4A, since the lens apparatus 593 is not provided with an optical image stabilization (OIS) function, it can be implemented more slimly.

The lens apparatus 593 may have at least one lens, and the lens may be moved for variable focus.

For example, the lens apparatus 593 may be provided with a plurality of lenses such as a concave lens and a convex lens, and may move at least one of internal lenses so as to achieve variable focus, based on a control signal from the image processor 830 or the controller 170. In particular, it may be moved to the image sensor 820b or in a direction opposite to the image sensor 820b.

Meanwhile, FIG. 5A illustrates that the image sensor 520, the lens apparatus 593, and the dual prism apparatus 592 are sequentially arranged, and the light incident on the dual prism apparatus 592 is transmitted to the lens apparatus 593 and the image sensor 520. However, the present invention is not limited thereto.

Specifically, the light from the above may be reflected by a an internal first reflective surface RSa of the first prism PSMa in the first prism module 592a and may be transmitted to the second prism module 592b, and may be reflected by an internal second reflective surface RSb of the second prism PSMb in the second prism module 592b and may be transmitted to the lens apparatus 593 and the image sensor 520.

That is, unlike FIG. 5A, the image sensor 520, the dual prism apparatus 592, and the lens apparatus 593 may be sequentially arranged, and the light incident on the lens apparatus 593 may be transmitted the dual prism apparatus 592 and the image sensor 520.

The dual prism apparatus 592 may include a first prism PSMa configured to reflect input light toward a first reflected direction, a first actuator ACTa configured to change an angle of the first prism PSMa about a first rotation axis Axma to change the first reflected direction based on a first control signal Saca, a second prism PSMb configured to reflect the light reflected from the first prism PSMa toward a second reflected direction, and a second actuator ACTb configured to change an angle of the second prism PSMb about a second rotation axis Axmb to change the second reflected direction based on a second control signal Sacb to perform optical image stabilization (OIS) for compensating movement of dual prism caused by hand tremble.

The first prism PSMa may comprise an internal first reflective surface RSa and the second prism PSMb comprises an internal second reflective surface RSb configured to reflect the light.

The first prism PSMa may receive the input light through a first entry prism surface ISa and output the input light reflected from the internal first reflective surface RSa through a first exit prism surface OSa, and the second prism PSMb may receive the reflected light through a second entry prism surface ISb and output the reflected light reflected from the internal second reflective surface RSb through a second exit prism surface OSb.

The first prism PSMa and second prism PSMb are configured such that the first exit prism surface OSa faces the second entry prism surface ISb.

The first rotation axis Axma of the first prism PSMa may be perpendicular to the second rotation axis Axmb of the second prism PSMb.

At this time, it is preferable that the first prism PSMa and the second prism PSMb intersect with each other. In particular, it is preferable that the first prism PSMa and the second prism PSMb are disposed perpendicular to each other.

Meanwhile, the refractive indices of the first prism PSMa and the second prism PSMb may be 1.7 or more. Accordingly, a total reflection may be performed in the first prism PSMa and the second prism PSMb, and thus, the light RI can be transmitted in the direction of the image sensor.

The refractive indices of the first prism PSMa and the second prism PSMb may be less than 1.7, and a reflective coating may be formed on a reflective surface of the first prism PSMa and the second prism PSMb. Accordingly, a total reflection can be performed in the first prism PSMa and the second prism PSMb, and thus, the light RI can be transmitted in the direction of the image sensor.

According to this, the image sensor 520, the lens apparatus 593, and the first prism module 592a may be disposed side by side in one direction, while the second prism module 592b is disposed to intersect with the first prism module 592a.

Accordingly, the first prism module 592a and the second prism module 592b may be referred to as an L-type dual prism apparatus 592. In addition, the camera 500a having this structure may be referred to as an L-type camera.

According to this structure, through the first prism module 592a and the second prism module 592b, a rotation may occur in a first direction CRa, e.g., in a counterclockwise direction ccw based on a first rotation axis Axma and a rotation may occur in a second direction CRb, e.g., in a counterclockwise direction ccw based on a second rotation axis Axmb to perform the angle compensation, thereby achieving the optical image stabilization (OIS) function.

For example, in response to a movement causing rotation of the first prism PSMa about the first rotation axis Axma by a first angle θ1 and rotation of the second prism PSMb about the second rotation axis Axmb by a second angle θ2, the first actuator ACTa is configured to rotate the first prism PSMa in a third direction opposite the first direction by a third angle θ3 in response to the first control signal Saca, the second actuator ACTb is configured to rotate the second prism PSMb in a fourth direction opposite the second direction by a fourth angle in response to the second control signal Sacb, the third angle θ3 may be half of the first angle θ1, and the fourth angle may be half of the second angle θ2. Accordingly, the compensation angle for the optical image stabilization (OIS) becomes small, so that the accuracy of the optical image stabilization (OIS) may be improved.

In particular, since angular compensation is performed by using the first actuator ACTa and the second actuator ACTb, there is an advantage that it is enough to compensate only an angle within a given range, regardless of whether the optical zoom of the lens apparatus 593 is a low magnification or a high magnification. Hence, regardless of the optical zoom, the accuracy of optical image stabilization (OIS) can be improved.

In addition, since an optimal space arrangement can be accomplished in a limited space, a slim camera 500a can be implemented. Therefore, the present invention can be applied to the mobile terminal 100, and the like.

FIG. 5A illustrates that the length of the lens apparatus 593 is denoted by Wa and the length of the dual prism apparatus 592 is denoted by Wpa, and the heights of the lens apparatus 593 and the dual prism apparatus 592 are denoted by ha.

Since the first prism module 592a and the second prism module 592b in the dual prism apparatus 592 are disposed to intersect with each other, as shown in the mobile terminal 100a of FIG. 5B, the movement direction of the incident light RI may be changed twice through the first prism module 592a and the second prism module 592b, and the image sensor 520 can be disposed in the left side of the mobile terminal 100a. In particular, the image sensor 520 may be disposed opposite the lateral side of the mobile terminal 100a.

Therefore, the thickness DDa of the mobile terminal 100a may be determined not by the sum (Wa+Wpa) of the lengths of the lens apparatus 593 and the dual prism apparatus 592, but by the height ha of the lens apparatus 593 and the dual prism apparatus 592 or the height ho of the image sensor 520.

Accordingly, as the height ha of the lens apparatus 593 and the dual prism apparatus 592 or the height ho of the image sensor 520 is designed to be low, the thickness DDa of the mobile terminal 100a can be slimly implemented. Accordingly, the slim camera 500a having a thin thickness and a mobile terminal 100a having the slim camera 500a can be implemented.

Figure 6A:
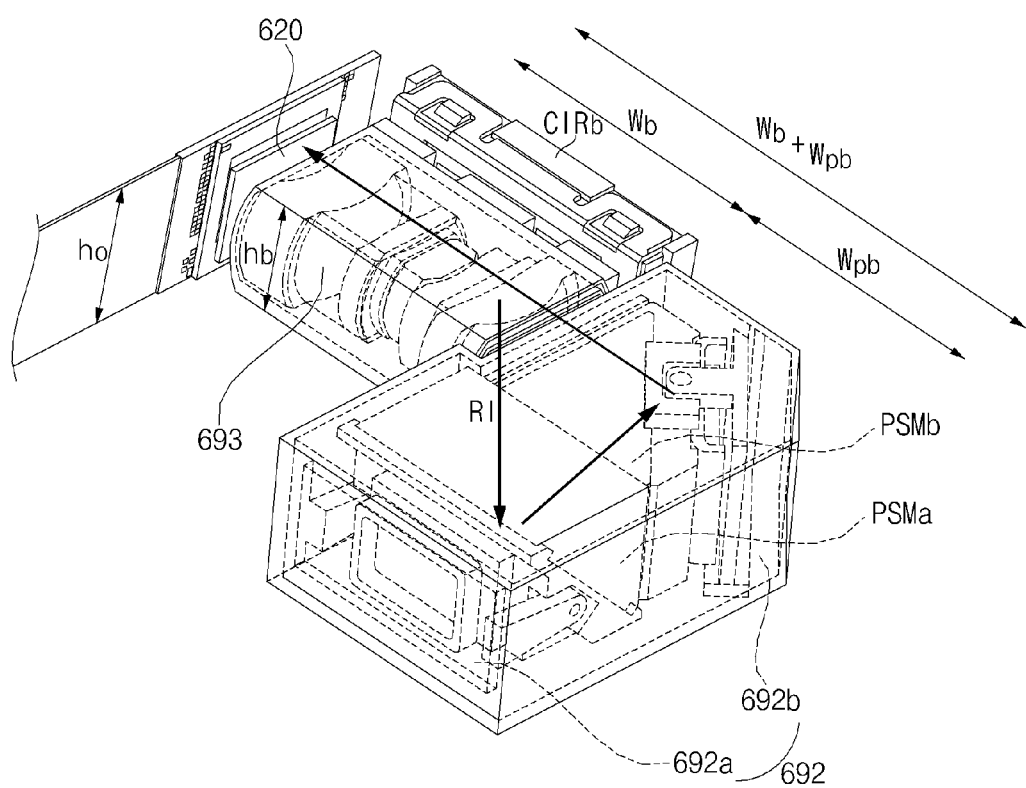
FIG. 6A is a diagram illustrating another example of a camera having a rotatable dual prism module according to an embodiment of the present invention.
Figure 6B:
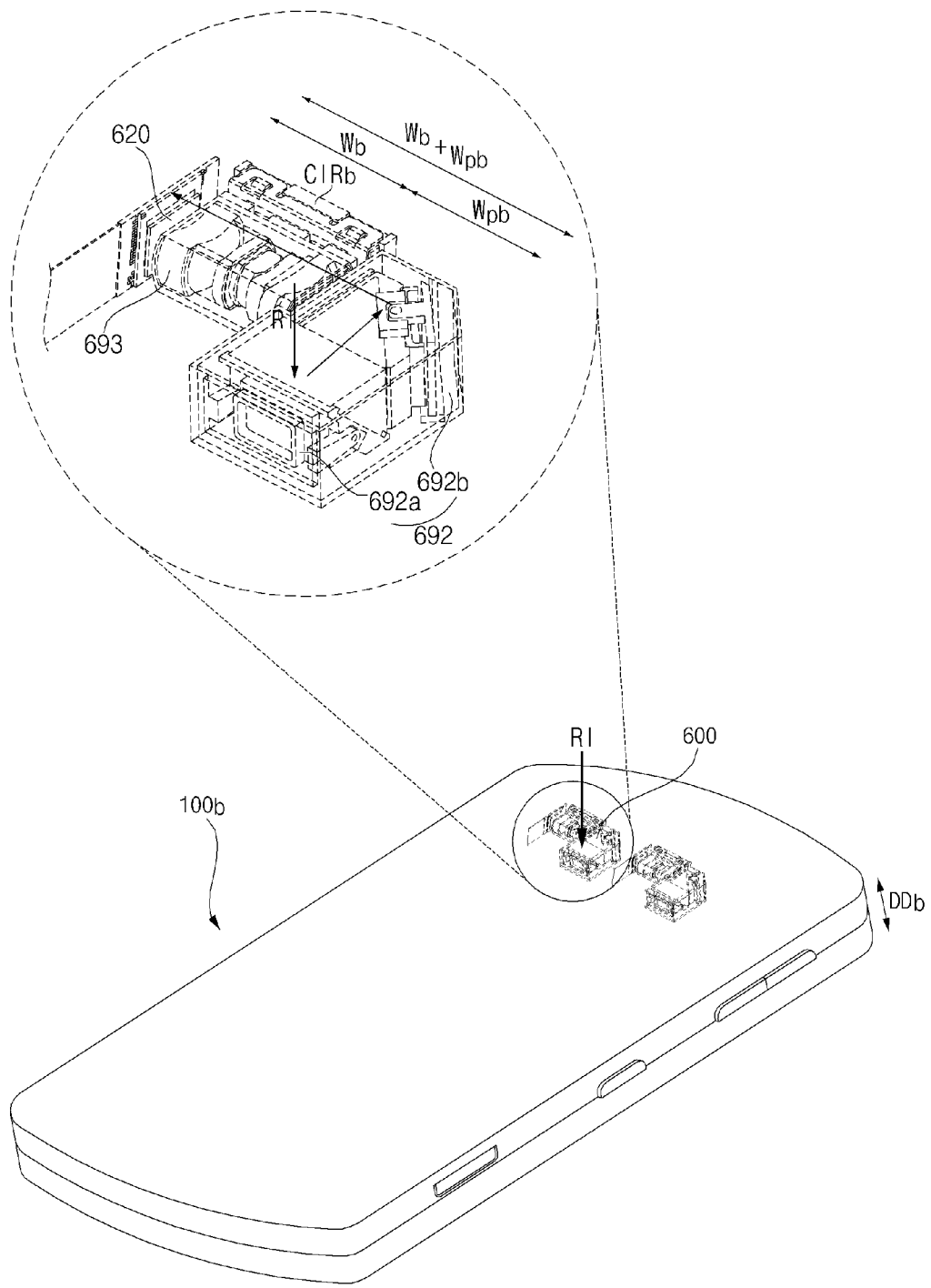
FIG. 6B is a diagram illustrating a mobile terminal having the camera of FIG. 6A.

FIG. 6A is a diagram illustrating another example of a camera having a rotatable dual prism module according to an embodiment of the present invention, FIG. 6B is a diagram illustrating a mobile terminal having the camera of FIG. 6A, and FIG. 7 to FIG. 10 are diagrams for explaining the camera of FIG. 6A.

Referring to the drawing, a camera 600 of FIG. 6A may include an image sensor 620, a lens apparatus 693 for transmitting light to the image sensor 620, a lens driving unit (CIRb) for moving a lens inside the lens apparatus 693, and a dual prism apparatus 692 having a first prism module 692a and a second prism module 692b.

The camera 600 of FIG. 6A is similar to the camera 500a of FIG. 5A, but has a difference in that the first prism module 692a and the second prism module 692b in the dual prism apparatus 692 are differently disposed. In this case, the difference is mainly described.

In the drawing, it is illustrated that the image sensor 620, the lens apparatus 693, and the dual prism apparatus 692 are sequentially disposed, and the light incident on the dual prism apparatus 692 is transmitted to the lens apparatus 693 and the image sensor 620.

Specifically, the light from the above may be reflected by a reflection surface of the first prism PSMa in the first prism module 692a and may be transmitted to the second prism module 692b, and may be reflected by a reflection surface of the second prism PSMb in the second prism module 692b and may be transmitted to the lens apparatus 693 and the image sensor 620.

That is, unlike FIG. 5A, there is a difference in that the first prism module 692a in the dual prism apparatus 692 of FIG. 6A is disposed in a forward direction in comparison with the second prism module 692b. Accordingly, the light reflected by the prism module PSMa in the first prism module 692a may travel in the ground direction or the right direction.

That is, unlike FIG. 6A, the image sensor 620, the dual prism apparatus 692, and the lens apparatus 693 may be sequentially disposed, and the light incident on the lens apparatus 693 may be transmitted to the dual prism apparatus 692 and the image sensor 620. Hereinafter, the structure of FIG. 6A will be mainly described.

The dual prism apparatus 692 may include a first prism PSMa configured to reflect input light toward a first reflected direction, a first actuator ACTa configured to change an angle of the first prism PSMa about a first rotation axis Axma to change the first reflected direction based on a first control signal Saca, a second prism PSMb configured to reflect the light reflected from the first prism PSMa toward a second reflected direction, and a second actuator ACTb configured to change an angle of the second prism PSMb about a second rotation axis Axmb to change the second reflected direction based on a second control signal Sacb.

The first prism PSMa may comprise an internal first reflective surface RSa and the second prism PSMb may comprise an internal second reflective surface RSb configured to reflect the light.

The first prism PSMa may receive the input light through a first entry prism surface ISa and output the input light reflected from the internal first reflective surface RSa through a first exit prism surface OSa, and the second prism PSMb may receive the reflected light through a second entry prism surface ISb and output the reflected light reflected from the internal second reflective surface RSb through a second exit prism surface OSb.

The first prism PSMa and second prism PSMb are configured such that the first exit prism surface OSa faces the second entry prism surface ISb.

The first rotation axis Axma of the first prism PSMa may be perpendicular to the second rotation axis Axmb of the second prism PSMb.

At this time, it is preferable that the first prism PSMa and the second prism PSMb intersect with each other. In particular, it is preferable that the first prism PSMa and the second prism PSMb are disposed perpendicular to each other.

Meanwhile, the refractive indices of the first prism PSMa and the second prism PSMb may be 1.7 or more. Accordingly, a total reflection may be performed in the first prism PSMa and the second prism PSMb, and thus, the light RI can be transmitted in the direction of the image sensor.

Meanwhile, the refractive indices of the first prism PSMa and the second prism PSMb may be less than 1.7, and a reflective coating may be formed on a reflective surface of the first prism PSMa and the second prism PSMb. Accordingly, a total reflection can be performed in the first prism PSMa and the second prism PSMb, and thus, the light RI can be transmitted in the direction of the image sensor 620.

According to this, the image sensor 620, the lens apparatus 693, and the first prism module 692a may be disposed side by side in one direction, while the second prism module 692b is disposed to intersect with the first prism module 692a.

Accordingly, the first prism module 692a and the second prism module 692b may be referred to as an L-type dual prism apparatus 692. In addition, the camera 600 having this structure may be referred to as an L-type camera.

According to this structure, through the first prism module 692a and the second prism module 692b, a rotation may occur in a first direction, e.g., in a counterclockwise direction CCW based on a first rotation axis Axa and a rotation may occur in a second direction, e.g., in a counterclockwise direction CCW based on a second rotation axis Axb to perform the angle compensation, thereby achieving the optical image stabilization (OIS) function.

In particular, since angular compensation is performed by using a rotary actuator, there is an advantage that it is enough to compensate only an angle within a given range, regardless of whether the optical zoom of the lens apparatus 693 is a low magnification or a high magnification. Hence, regardless of the optical zoom, the accuracy of optical image stabilization (OIS) can be improved.

In addition, since an optimal space arrangement can be accomplished in a limited space, a slim camera 600 can be implemented. Therefore, the present invention can be applied to the mobile terminal 100, and the like.

FIG. 6A illustrates that the length of the lens apparatus 693 is denoted by Wb and the length of the dual prism apparatus 692 is denoted by Wpb, and the heights of the lens apparatus 693 and the dual prism apparatus 692 are denoted by hb.

Since the first prism module 692a and the second prism module 692b in the dual prism apparatus 692 are disposed to intersect with each other, as shown in the mobile terminal 100b of FIG. 6B, the movement direction of the incident light RI may be changed twice through the first prism module 692a and the second prism module 692b, and the image sensor 620 can be disposed in the left side of the mobile terminal 100b. In particular, the image sensor 620 may be disposed opposite the lateral side of the mobile terminal 100b.

Therefore, the thickness DDb of the mobile terminal 100a may be determined not by the sum (Wb+Wpb) of the lengths of the lens apparatus 693 and the dual prism apparatus 692, but by the height ho of the lens apparatus 693 and the dual prism apparatus 692 or the height ho of the image sensor 620.

Accordingly, as the height hb of the lens apparatus 693 and the dual prism apparatus 692 or the height ho of the image sensor 620 is designed to be low, the thickness DDb of the mobile terminal 100y can be slimly implemented. Accordingly, the slim camera 600 having a thin thickness and a mobile terminal 100b having the slim camera 600 can be implemented.

Figure 7:
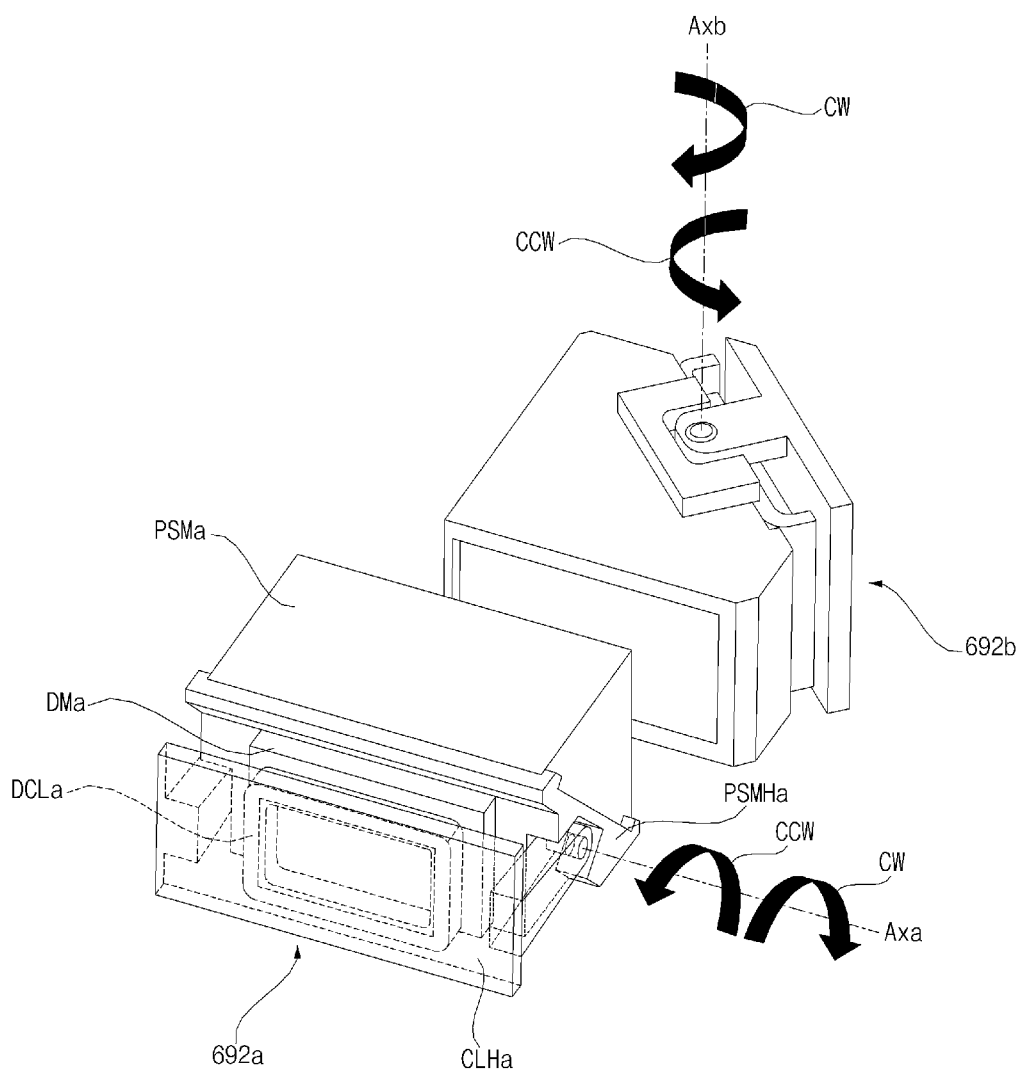
FIGS. 7 to 10 are diagrams for explaining the camera of FIG. 6A.
Figure 8:
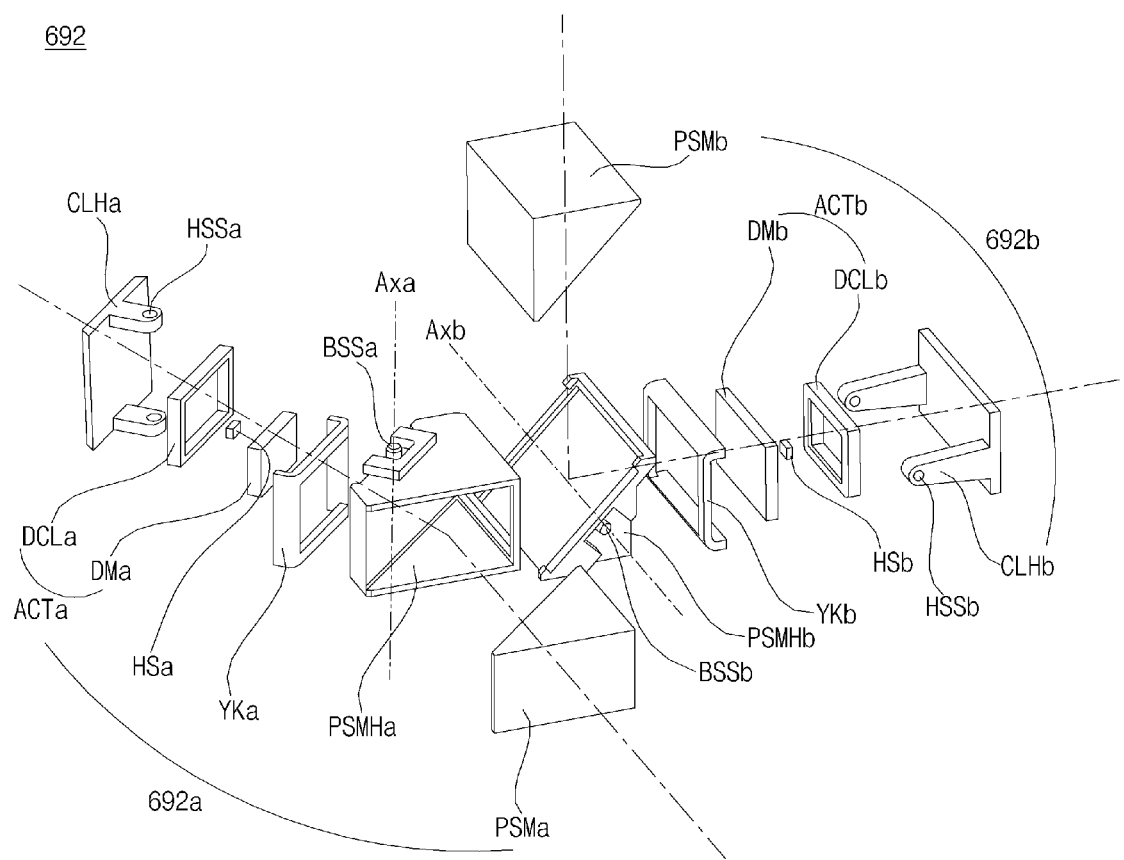

Meanwhile, referring to FIGS. 7 and 8, the dual prism apparatus 692 may include the first prism module 692a and the second prism module 692b.

The first prism module 692a may include the first prism PSMa, a first prism holder PSMHa configured to secure the first prism PSMa, a first yoke Yka coupled to a rear of the first prism holder PSMHa, the first drive magnet DMa coupled to a rear of the first yoke Yka, a first coil holder CLHa including a plurality of protrusions protruding toward the first prism holder PSMHa, each of the plurality of protrusions comprises an opening HSSa, and the openings HSSa define the first rotation axis Axa.

The first drive coil DCLa may be disposed between the first coil holder CLHa and the first yoke Yka, the first prism holder PSMHa may comprise a plurality of bosses BSSa configured to engage with the openings of the plurality of protrusions to allow rotation of the first prism PSMa about the first prism PSMa axis.

The boss BSSa in both ends of the first prism holder PSMHa may be coupled with the opening HSSa formed in both ends in the coil holder CLHa.

Meanwhile, the drive magnet DMa and the drive coil DCLa in the first prism module 692a may constitute a first rotary actuator ACTa.

For example, in order to compensate the first direction motion among the first direction motion and the second direction motion sensed by the motion sensor 145, particularly, the gyro sensor 145c, shown in FIG. 3C or FIG. 3D, the drive controller DRC may output the first control signal Saca to the first actuator ACTa in the first prism module 692a.

The first actuator ACTa may change the angle of the first prism PSMa based on the first rotation axis, based on the first control signal Saca.

In particular, based on the first control signal Saca applied to the drive coil DCLa in the first actuator ACTb, the angle of the first prism PSMa can be changed based on the first rotation axis.

Meanwhile, the first hall sensor HSa may sense a change in the magnetic field in order to check motion information due to the movement of the first prism PSMa. Specially, the first hall sensor HSa may sense an angle change of the first prism PSMa based on a first magnetic field.

In addition, the motion information, particularly, the magnetic field or change of the magnetic field information Shsa, detected by the first hall sensor HSa may be input to the drive controller DRC.

The drive controller DRC may perform a PI control or the like, based on the control signal Saca for motion compensation and the motion information, in particular, the magnetic field or change of the magnetic field information Shsa. Accordingly, the motion of the first prism PSMa can be accurately controlled.

That is, the drive controller DRC may perform a closed loop by receiving the information Shsa detected by the first hall sensor HSa, and can accurately control the motion of the first prism PSMa.

Accordingly, the first drive magnet DMa, the first prism holder PSMHa, and the first prism PSMa may be rotated based on the first rotation axis Axa.

Meanwhile, the first coil holder CLHa, the first drive coil DCLa, and the first hall sensor HSa may be fixed without being rotated based on the first rotation axis Axa.

As described above, some units in the first prism module 692a may rotate and some units may be fixed, thereby detecting the movement caused by hand tremble based on a magnetic field signal sensed in the first hall sensor HSa. In order to perform optical image stabilization (OIS) for compensating movement of dual prism caused by hand tremble, the first drive magnet DMa may rotate so that the first prism PSMa or the like can be rotated. Thus, the optical image stabilization (OIS) in the first direction can be accurately performed.

Meanwhile, referring to FIG. 8, the second prism module 692b may include the second prism PSMb, a second prism holder PSMHb configured to secure the second prism PSMb, a second yoke Ykb coupled to a rear of the second prism holder PSMHb, the second drive magnet DMb coupled to a rear of the second yoke Ykb, a second coil holder CLHb including a plurality of protrusions protruding toward the second prism holder PSMHb, each of the plurality of protrusions comprises an opening, and the openings define the second rotation axis Axb. Accordingly, the second drive magnet DMb, the second prism holder PSMHb, and the second prism PSMb can be rotated based on the second rotation axis Axb.

The second drive coil DCLb may be disposed between the second coil holder CLHb and the second yoke Ykb, and the second prism holder PSMHb may comprise a plurality of bosses BSSb configured to engage with the openings of the plurality of protrusions to allow rotation of the second prism PSMb about the second prism PSMb axis.

The second coil holder CLHb may have a protrusion in both ends protruding in the direction of the second prism holder PSMb, and an opening HSSb formed in the protrusions respectively. The second coil holder CLHb can fix the drive coil DCLb.

The second prism holder PSMHb may have a boss BSSb in both ends protruding in the direction of the second coil holder CLHb.

The boss BSSb in both ends of the second prism holder PSMHb may be coupled with the opening HSSb formed in both ends in the second coil holder CLHb.

Meanwhile, the second drive magnet DMb and the second drive coil DCLb in the second prism module 692b may constitute a second rotary actuator ACTb.

For example, in order to compensate the second direction motion among the first direction motion and the second direction motion sensed by the motion sensor 145, particularly, the gyro sensor 145c, shown in FIG. 3C or FIG. 3D, the drive controller DRC may output the second control signal Sacb to the second actuator ACTb in the second prism module 692b.

The second actuator ACTb may change the angle of the second prism PSMb based on the second rotation axis, based on the second control signal Sacb.

In particular, based on the second control signal Sacb applied to the drive coil DCLb in the second actuator ACTb, the angle of the second prism PSMb can be changed based on the second rotation axis Axb.

Meanwhile, the second hall sensor HSb may sense a change in the magnetic field in order to check motion information due to the movement of the second prism PSMb. Specially, a second hall sensor HSb may sense an angle change of the second prism PSMb based on a second magnetic field.

In addition, the motion information, particularly, the magnetic field or change of the magnetic field information Shsb, detected by the second hall sensor HSb may be input to the drive controller DRC.

The drive controller DRC may perform a PI control or the like, based on the control signal Sacb for motion compensation and the motion information, in particular, the magnetic field or change of the magnetic field information Shsb. Accordingly, the motion of the second prism PSMb can be accurately controlled.

That is, the drive controller DRC may perform a closed loop by receiving the information Shsb detected by the second hall sensor HSb, and can accurately control the motion of the second prism PSMb.

Accordingly, the second drive magnet DMb, the second prism holder PSMHb, and the second prism PSMb may be rotated based on the second rotation axis Axb.

Meanwhile, the second coil holder CLHb, the second drive coil DCLb, and the second hall sensor HSb may be fixed without being rotated based on the second rotation axis Axb.

As described above, some units in the second prism module 692b may rotate and some units may be fixed, thereby detecting the movement caused by hand tremble based on a magnetic field signal sensed in the second hall sensor HSb. In order to perform optical image stabilization (OIS) for compensating movement of dual prism caused by hand tremble, the second drive magnet DMb may rotate so that the second prism PSMb or the like can be rotated. Thus, the optical image stabilization (OIS) in the second direction can be accurately performed.

For example, as shown in FIG. 7, when the first prism PSMa is rotated in the clockwise direction CW based on the first rotation axis Axa due to the hand tremble of the user, the drive controller DRC may control the first prism PSMa, a first sensor magnet SMa, and the like to rotate in the counterclockwise direction CCW based on the first rotation axis Axa, by using the rotary actuator, particularly, the first drive magnet DMa and the first drive coil DCLa so as to perform optical image stabilization (OIS) for compensating movement of dual prism caused by hand tremble.

Particularly, when the first control signal Saca from the drive controller DRC is applied to the first drive coil DCLa in the first actuator ACTa, a Lorentz force may be generated between the first drive coil DCLa and the first drive magnet DMa, so that the first drive magnet DMa can rotate in the counterclockwise direction CCW.

At this time, the first hall sensor Hsa may detect a change in the magnetic field that is variable, by the counterclockwise CCW rotation of the first sensor magnet SMa.

In addition, the drive controller DRC may perform a closed loop based on the information Shsa detected by the first hall sensor HSa, so that the counterclockwise CCW rotation of the first drive magnet DMa can be more accurately controlled.

For another example, as shown in FIG. 7, when the second prism PSMb is rotated in the clockwise direction CW based on the second rotation axis Axb due to the hand tremble of the user, the drive controller DRC may control the second prism PSMb, a second sensor magnet SMb, and the like to rotate in the counterclockwise direction CCW based on the second rotation axis Axb, by using a second rotary actuator, particularly, the second drive magnet DMb and the second drive coil DCLb so as to perform optical image stabilization (OIS) for compensating movement of dual prism caused by hand tremble.

Particularly, when the second control signal Sacb from the drive controller DRC is applied to the second drive coil DCLb in the second actuator ACTb, a Lorentz force may be generated between the second drive coil DCLb and the second drive magnet DMb, so that the second drive magnet DMb can rotate in the counterclockwise direction CCW.

At this time, the second hall sensor Hsb may detect a change in the magnetic field that is variable, by the counterclockwise CCW rotation of the second sensor magnet SMb.

In addition, the drive controller DRC may perform a closed loop based on the information Shsb detected by the second hall sensor HSb, so that the counterclockwise CCW rotation of the second drive magnet DMb can be more accurately controlled.

As described above, the first prism module 692a and the second prism module 692b may be independently driven respectively, based on the first rotation axis Axa and the second rotation axis Axb, depending on the hand tremor movement. Therefore, the optical image stabilization (OIS) for a plurality of directions can be performed quickly and accurately.

Meanwhile, when the first prism PSMa moves at a first angle of a first direction of the first rotation axis Axa, the first actuator ACTa may change the first prism PSMa into a second angle θ2 which is half of the first angle θ1, in a second direction opposite the first direction of the first rotation axis Axa. According to this, motion compensation may be performed at an angle smaller than the motion of the user's trembling hand in spite of the motion of the user's trembling hand, so that accurate optical image stabilization (OIS) can be performed. In addition, the power consumption can also be reduced.

Meanwhile, when the second prism PSMb moves at a third angle θ3 in a third direction of the second rotation axis Axb, the second actuator ACTb may change the second prism PSMb into a fourth angle θ4 which is half the third angle θ3, in a fourth direction opposite the third direction of the second rotation axis Axb. (See FIGS. 9D and 9E which also illustrate reflection surface SFb of the second prism PSMb.) According to this, motion compensation may be performed at an angle smaller than the motion of the user's trembling hand in spite of the motion of the user's trembling hand, so that accurate optical image stabilization (OIS) can be performed. In addition, the power consumption can also be reduced. This will be described with reference to FIGS. 9A to 9C below.

Figure 9A:
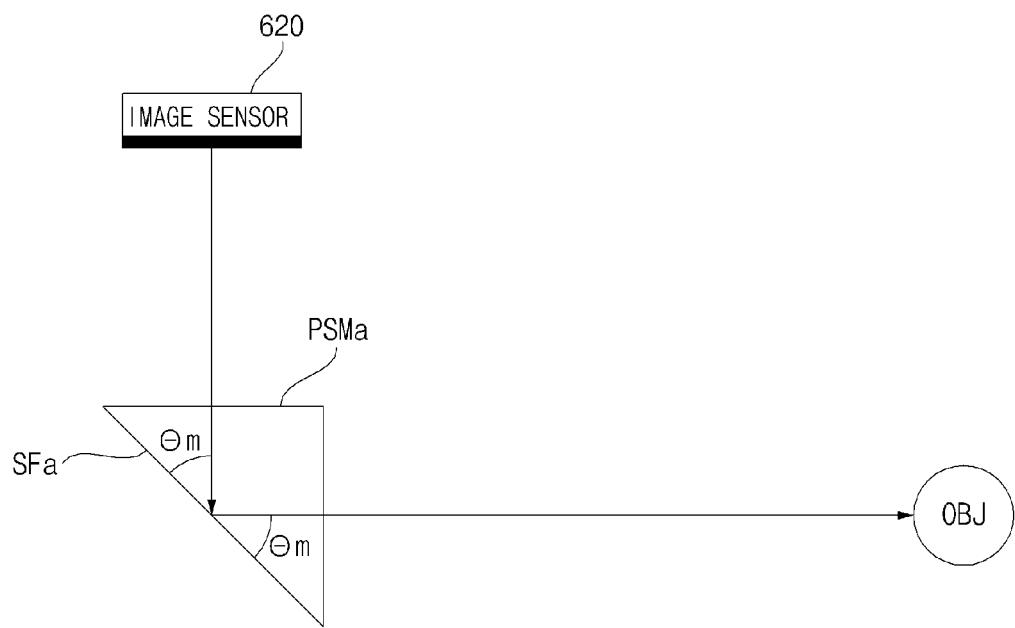
Figure 9B:
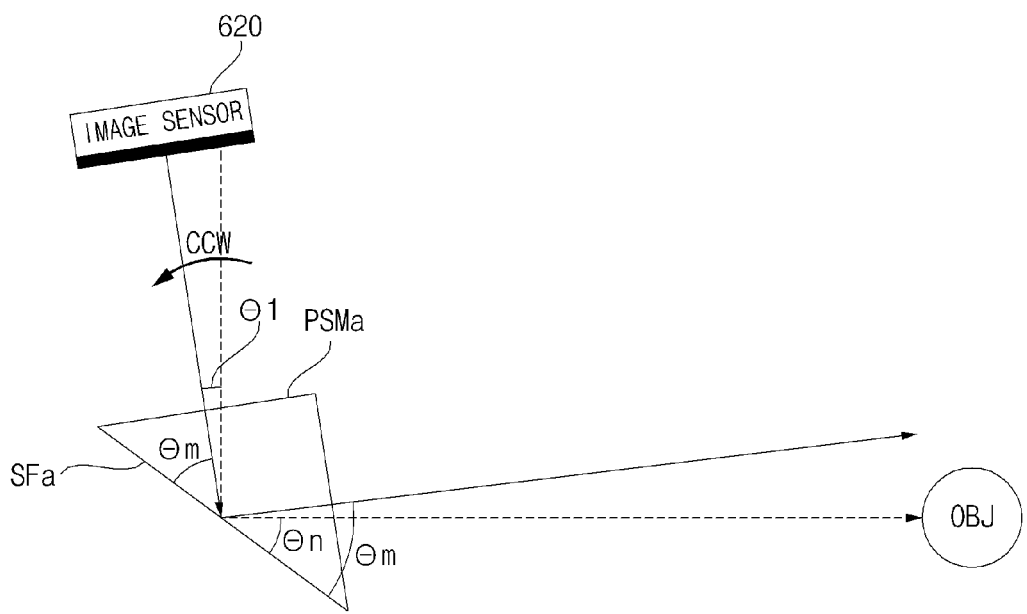
Figure 9C:
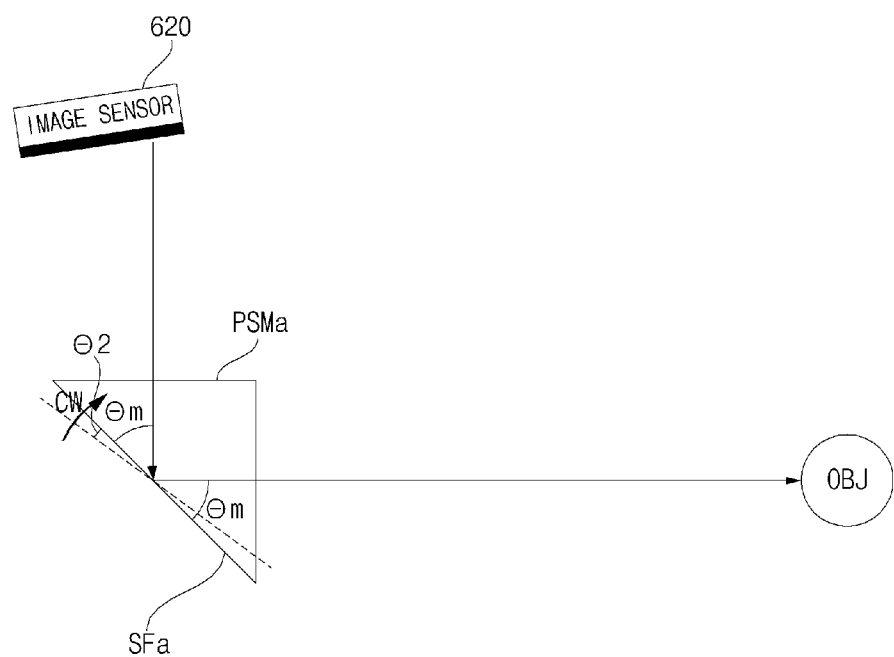
Figure 9D:
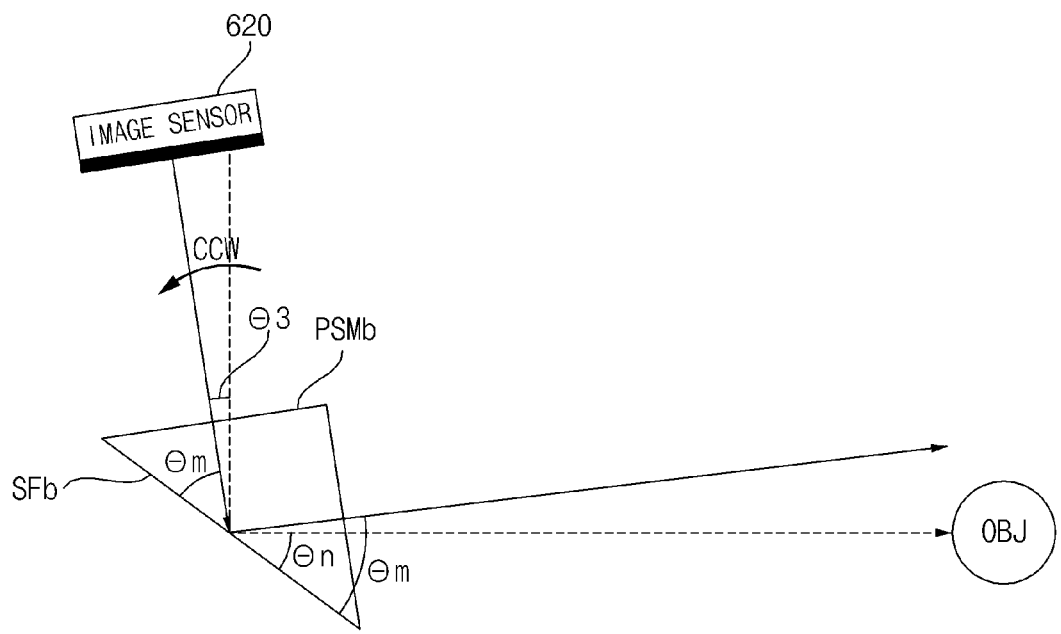
Figure 9E:
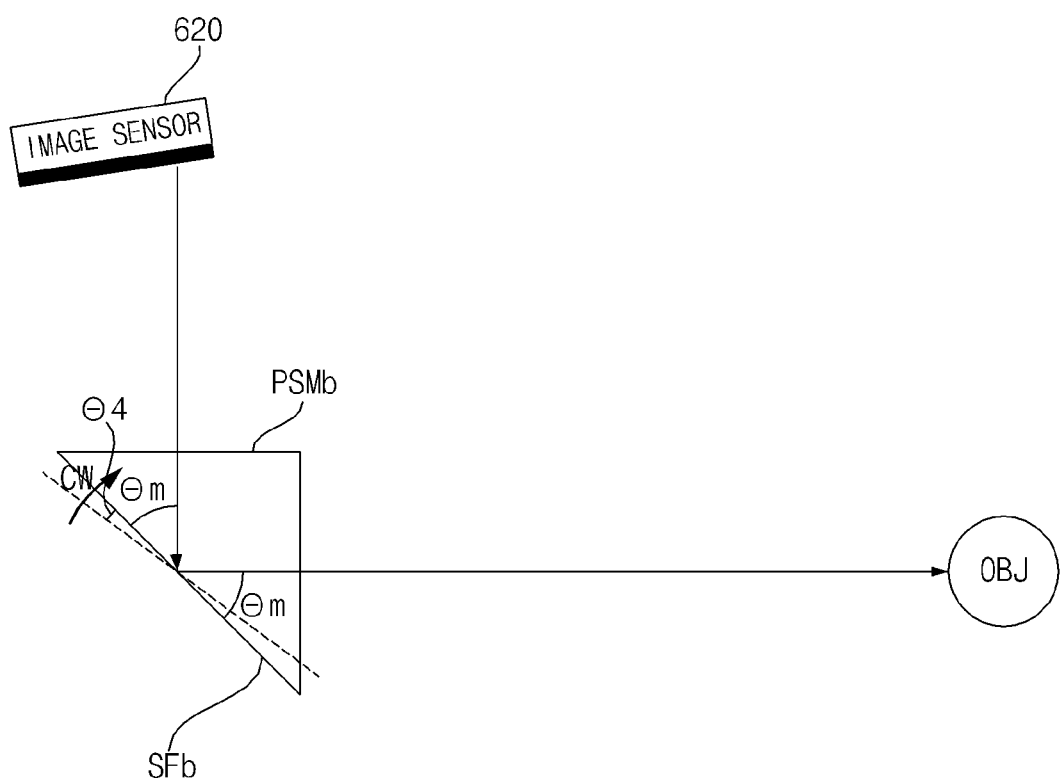

FIGS. 9A to 9C are diagrams for explaining a motion of a trembling hand and the optical image stabilization (OIS) according to the motion of the trembling hand.

Hereinafter, for convenience of explanation, the image sensor 620, the first prism PSMa, and a front object OBJ will be described.

Firstly, FIG. 9A illustrates that the first prism PSMa disposed between the front object OBJ and the image sensor 620 is fixed, when there is no motion or trembling by a hand of the user.

Referring to FIG. 9A, the image sensor 620 and the reflection surface SFa of the first prism PSMa may have an angle θm, and the angle between the reflection surface SFa of the first prism PSMa and the front object OBJ may be the same angle θm. Here, the angle θm may be approximately 45 degrees.

According to this, the image sensor 620 may capture light for the front object OBJ, through the light which is reflected and inputted by the reflection surface SFa of the first prism PSMa, and convert the captured light into an electric signal. Therefore, image conversion for the front object OBJ can be achieved.

Next, FIG. 9B illustrates that the first prism PSMa disposed between the front object OBJ and the image sensor 620 rotates in the counterclockwise direction CCW by the first angle θ1, when trembling of the user's hand is generated in the counterclockwise direction CCW by the first angle θ1.

Referring to FIG. 9B, the image sensor 620 and the reflection surface SFa of the rotated first prism PSMa may have an angle θm, but the angle between the reflection surface SFa of the rotated first prism PSMa and the front object OBJ may be θn smaller than the angle θm.

In other words, the image sensor 620 and the reflection surface SFa of the rotated first prism PSMa have an angle θm, and the front object OBJ does not exist in the direction of the angle θm from the reflection surface SFa of the rotated first prism PSMa.

Therefore, the image sensor 620 cannot capture the light for the front object OBJ, through the light which is reflected and inputted by the reflection surface SFa of the first prism PSMa.

Thus, the first actuator ACTa may rotate the first prism PSMa at the second angle θ2 which is half the first angle θ1, in the clockwise direction CW.

FIG. 9C illustrates that the first prism PSMa is rotated by the second angle θ2 which is half the first angle θ1 in the clockwise direction CW, in order to perform optical image stabilization (OIS) for compensating movement of dual prism caused by trembling of the user's hand.

Accordingly, like FIG. 9A, the image sensor 620 and the reflection surface SFa of the rotated first prism PSMa may have an angle θm, and the angle between the reflection surface SFa of the rotated first prism PSMa and the front object OBL may be θm.

According to this, the image sensor 620 may capture the light for the front object OBJ, through the light reflected and inputted by the reflection surface SFa of the first prism PSMa, and convert the light into an electric signal. Therefore, in spite of the trembling hand, the image conversion for the front object OBJ can be stably achieved through the optical image stabilization (OIS).

Figure 10:
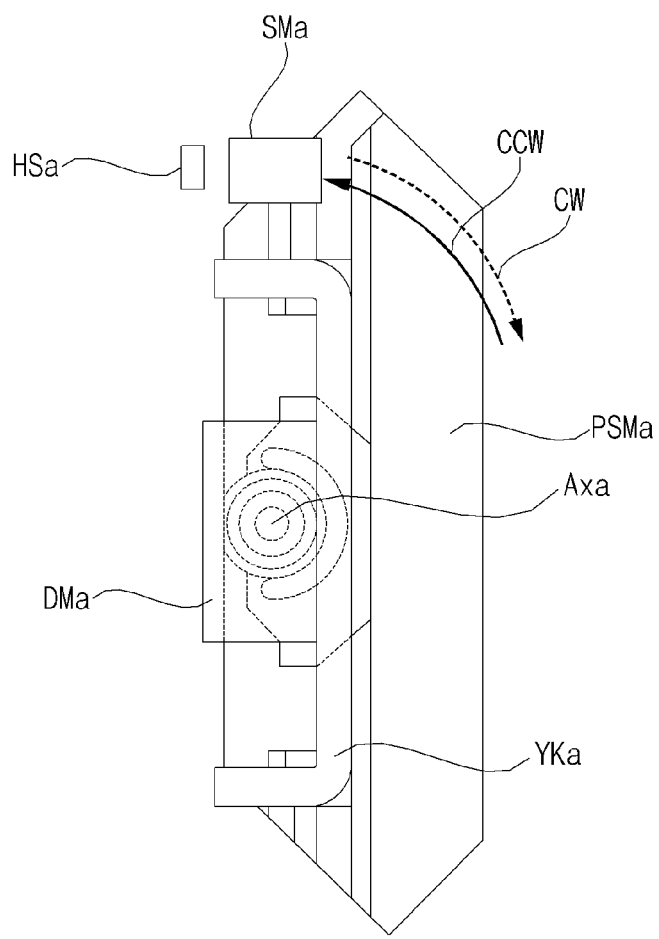

FIG. 10 is a diagram of the first prism module 692a of FIG. 6A and FIG. 7 in a downward direction from the above of the first rotation axis Axa.

According to the prism module 692a of FIG. 10, the first prism PSMa may be disposed on a first surface of the first prism holder PSMHa, and the first yoke Yka may be disposed on a second surface, which is a rear surface of the first surface of the first prism holder PSMHa. Particularly, the first surface of the first yoke Yka may be disposed on the second surface of the first prism holder PSMHa.

Meanwhile, the first sensor magnet SMa may be disposed in the upper side of the first yoke Yka, and the first hall sensor Hsa may be disposed apart from the first sensor magnet SMa.

That is, in a state where the first rotation axis Axa is positioned in the vertical direction of the ground, the first yoke Yka may be disposed around the first rotation axis AXa, the first sensor magnet SMa may be disposed apart from the first yoke Yka, and the first hall sensor Hsa may be disposed apart from the first sensor magnet SMa.

At this time, a separation distance may be increased in the order of the first yoke Yka, the first sensor magnet SMa, and the first hall sensor Hsa, based on the rotation first axis AXa.

Meanwhile, the first yoke Yka and the first sensor magnet SMa may be spaced apart from each other in the vertical direction of the ground, and the first sensor magnet SMa and the first hall sensor Hsa may be spaced apart from each other in the horizontal direction.

That is, the spacing direction between the first yoke Yka and the first sensor magnet SMa, and the spacing direction between the first sensor magnet SMa and the first hall sensor Hsa may intersect with each other.

Meanwhile, the positions of the first hall sensor Hsa and the first sensor magnet SMa can be variously modified.

At this time, as mentioned in the description of FIG. 6A to FIG. 8, when the first prism PSMa rotates in a first clockwise direction CCW based on the first rotation axis Axa due to the trembling of the user's hand, the drive controller DRC may control the first prism PSMa, the first sensor magnet SMa, and the like to rotate in the counterclockwise direction CCW based on the first rotation axis Axa, by using the first rotary actuator, particularly, the first drive magnet DMa and the first drive coil, so as to perform optical image stabilization (OIS) for compensating movement of dual prism caused by hand tremble.

Particularly, when the first control signal Saca from the drive controller DRC is applied to the first drive coil DCLa inside the first actuator ACTa, a Lorentz force may be generated between the first drive coil DCLa and the first drive magnet DMa, so that the first drive magnet DMa can rotate in the counterclockwise direction CCW.

At this time, the first hall sensor Hsa may sense a change in the magnetic field that is variable, by the counterclockwise CCW rotation of the first sensor magnet SMa.

Meanwhile, when the range of the rotation angle of the clockwise direction CW due to the hand tremble is approximately between 10 degrees and −10 degrees, the angle compensation range by the rotation in the counterclockwise direction CCW may be approximately between 5 degrees and −5 degrees which is half of the range of the rotation angle of the clockwise direction CW due to the hand tremble.

Meanwhile, referring to FIG. 10, even if the rotation angle of the clockwise direction CW is small as the trembling of the hand is small, the first hall sensor Hsa can perform an accurate detection, thereby improving the accuracy of the angle compensation for the rotation of counterclockwise direction CCW.

Meanwhile, the description of FIG. 10 is given based on the first prism module 692a among the first prism module 692a and the second prism module 692b of FIGS. 6A to 8, and can be applied to the first prism module 692a. However, the present invention is not limited thereto, and can also be applied to the second prism module 692b.

Meanwhile, the prism apparatus 692 having the first prism module 692a and the second prism module 692b described with reference to FIGS. 6A to 10 can be employed in various electronic apparatuses such as the mobile terminal 100 of FIG. 2, a vehicle, TV, a drone, a robot, a robot cleaner, and the like.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

MODE FOR INVENTION

Various embodiments have been described in the best mode for carrying out the invention.

INDUSTRIAL APPLICABILITY

The present invention is applicable to a prism apparatus, and a camera apparatus including the same, and more particularly, to a prism apparatus capable of performing optical image stabilization (OIS) for compensating movement of dual prism caused by camera shake.

The invention claimed is:

1. A prism apparatus for a camera apparatus, the prism apparatus comprising:
a drive controller;
a first prism configured to reflect input light toward a first reflected direction;
a first actuator configured to change an angle of the first prism about a first rotation axis to change the first reflected direction based on a first control signal;
a second prism configured to reflect the light reflected from the first prism toward a second reflected direction; and
a second actuator configured to change an angle of the second prism about a second rotation axis to change the second reflected direction based on a second control signal,
wherein the first rotation axis of the first prism is perpendicular to the second rotation axis of the second prism,
wherein in response to a movement causing rotation of the first prism about the first rotation axis by a first angle, the drive controller is configured to generate the first control signal to cause the first actuator to rotate the first prism in a direction opposite the first reflected direction by half of the first angle.

2. The prism apparatus of claim 1, wherein the first prism comprises an internal first reflective surface and the second prism comprises an internal second reflective surface configured to reflect the light.

3. The prism apparatus of claim 2, wherein:
the first prism is configured to receive the input light through a first entry prism surface and output the input light reflected from the internal first reflective surface through a first exit prism surface; and
the second prism is configured to receive the reflected light through a second entry prism surface and output the reflected light reflected from the internal second reflective surface through a second exit prism surface.

4. The prism apparatus of claim 3, wherein the first prism and second prism are configured such that the first exit prism surface faces the second entry prism surface.

5. The prism apparatus of claim 1, wherein:
in response to a movement causing rotation of the second prism about the second rotation axis by a second angle, the second actuator is configured to rotate the second prism in a direction opposite the second reflected direction by half of the second angle in response to the second control signal.

6. The prism apparatus of claim 1, further comprising:
a first hall sensor configured to sense an angle change of the first prism based on a first magnetic field; and
a second hall sensor configured to sense an angle change of the second prism based on a second magnetic field.

7. The prism apparatus of claim 6, wherein the first actuator comprises a first drive magnet and a first drive coil.

8. The prism apparatus of claim 7, further comprising:
a first prism holder configured to secure the first prism;
a first yoke coupled to a rear of the first prism holder;
the first drive magnet coupled to a rear of the first yoke;
a first coil holder including a plurality of protrusions protruding toward the first prism holder, wherein each of the plurality of protrusions comprises an opening, and wherein the openings define the first rotation axis;
wherein the first drive coil is disposed between the first coil holder and the first yoke,
wherein the first prism holder comprises a plurality of bosses configured to engage with the openings of the plurality of protrusions to allow rotation of the first prism about the first prism axis.

9. The prism apparatus of claim 8, wherein the second actuator comprises a second drive magnet and a second drive coil.

10. The prism apparatus of claim 9, further comprising:
a second prism holder configured to secure the second prism;
a second yoke coupled to a rear of the second prism holder;
the second drive magnet coupled to a rear of the second yoke;
a second coil holder including a plurality of protrusions protruding toward the second prism holder, wherein each of the plurality of protrusions comprises an opening, and wherein the openings define the second rotation axis;
wherein the second drive coil is disposed between the second coil holder and the second yoke,
wherein the second prism holder comprises a plurality of bosses configured to engage with the openings of the plurality of protrusions to allow rotation of the second prism about the second prism axis.

11. The prism apparatus of claim 1, wherein refractive indices of the first prism and the second prism are 1.7 or greater.

12. The prism apparatus of claim 1, wherein refractive indices of the first prism and the second prism are less than 1.7, and
wherein a reflective coating is formed on reflective surfaces of the first prism and the second prism.

13. A camera apparatus comprising:
a drive controller;
a gyro sensor configured to sense a movement of the camera apparatus;
a dual prism apparatus configured to direct input light;
a lens apparatus comprising a plurality of lenses configured to be adjusted to achieve variable focus; and
an image sensor configured to generate an image signal based on the input light,
wherein the dual prism apparatus comprises:
a first prism configured to reflect input light toward a first reflected direction;
a first actuator configured to change an angle of the first prism about a first rotation axis to change the first reflected direction based on a first control signal;
a second prism configured to reflect the light reflected from the first prism toward a second reflected direction; and
a second actuator configured to change an angle of the second prism about a second rotation axis to change the second reflected direction based on a second control signal for outputting the reflected light toward the lens apparatus and the image sensor
wherein the first rotation axis of the first prism is perpendicular to the second rotation axis of the second prism,
wherein in response to the movement causing rotation of the first prism about the first rotation axis by a first angle, the drive controller is configured to generate the first control signal to cause the first actuator to rotate the first prism in a direction opposite the first reflected direction by half of the first angle.

14. The camera apparatus of claim 13, wherein:
in response to the movement causing rotation of the second prism about the second rotation axis by a second angle, the drive controller is configured to:
generate the second control signal to cause the second actuator to rotate the second prism in a direction opposite the second reflected direction by half of the second angle.

15. The camera apparatus of claim 13, wherein the first prism comprises an internal first reflective surface and the second prism comprises an internal second reflective surface configured to reflect the light,
wherein:
the first prism is configured to receive the input light through a first entry prism surface and output the input light reflected from the internal first reflective surface through a first exit prism surface; and
the second prism is configured to receive the reflected light through a second entry prism surface and output the reflected light reflected from the internal second reflective surface through a second exit prism surface.

16. The camera apparatus of claim 13, wherein:
in response to the movement causing the rotation of the first prism about the first rotation axis by the first angle and rotation of the second prism about the second rotation axis by a second angle, the first actuator is configured to rotate the first prism in the direction opposite the first reflected direction by half of the first angle in response to the first control signal, the second actuator is configured to rotate the second prism in a direction opposite the second reflected direction by half of the second angle in response to the second control signal.

17. The camera apparatus of claim 13, wherein the dual prism apparatus further comprising:
 a first hall sensor configured to sense an angle change of the first prism based on a first magnetic field; and
 a second hall sensor configured to sense an angle change of the second prism based on a second magnetic field.

18. The prism apparatus of claim 17, wherein the first actuator comprises a first drive magnet and a first drive coil,
 wherein the dual prism apparatus further comprising:
 a first prism holder configured to secure the first prism;
 a first yoke coupled to a rear of the first prism holder;
 the first drive magnet coupled to a rear of the first yoke;
 a first coil holder including a plurality of protrusions protruding toward the first prism holder, wherein each of the plurality of protrusions comprises an opening, and wherein the openings define the first rotation axis;
 wherein the first drive coil is disposed between the first coil holder and the first yoke,
 wherein the first prism holder comprises a plurality of bosses configured to engage with the openings of the plurality of protrusions to allow rotation of the first prism about the first prism axis.

19. The prism apparatus of claim 18, wherein the second actuator comprises a second drive magnet and a second drive coil,
 wherein the dual prism apparatus further comprising:
 a second prism holder configured to secure the second prism;
 a second yoke coupled to a rear of the second prism holder;
 the second drive magnet coupled to a rear of the second yoke;
 a second coil holder including a plurality of protrusions protruding toward the second prism holder, wherein each of the plurality of protrusions comprises an opening, and wherein the openings define the second rotation axis;
 wherein the second drive coil is disposed between the second coil holder and the second yoke,
 wherein the second prism holder comprises a plurality of bosses configured to engage with the openings of the plurality of protrusions to allow rotation of the second prism about the second prism axis.

\* \* \* \* \*